US008988571B2

(12) United States Patent
Sugawa et al.

(10) Patent No.: US 8,988,571 B2
(45) Date of Patent: Mar. 24, 2015

(54) SOLID-STATE IMAGE SENSOR

(75) Inventors: Shigetoshi Sugawa, Sendai (JP); Yasushi Kondo, Kyoto (JP); Hideki Tominaga, Uji (JP)

(73) Assignees: Tohoku University, Miyagi (JP); Shimadzu Corporation, Kyoto (JP)

( * ) Notice: Subject to any disclaimer, the term of this patent is extended or adjusted under 35 U.S.C. 154(b) by 639 days.

(21) Appl. No.: 12/676,562

(22) PCT Filed: Sep. 4, 2008

(86) PCT No.: PCT/JP2008/002425
§ 371 (c)(1),
(2), (4) Date: Mar. 4, 2010

(87) PCT Pub. No.: WO2009/031301
PCT Pub. Date: Mar. 12, 2009

(65) Prior Publication Data
US 2010/0208115 A1 Aug. 19, 2010

(30) Foreign Application Priority Data
Sep. 5, 2007 (JP) .................................. 2007-230178

(51) Int. Cl.
*H04N 5/335* (2011.01)
*H04N 5/355* (2011.01)
(Continued)

(52) U.S. Cl.
CPC ....... *H04N 5/35527* (2013.01); *H04N 5/37452* (2013.01); *H04N 5/378* (2013.01)
USPC ......................................................... 348/308

(58) Field of Classification Search
CPC   H04N 5/35527; H04N 5/37452; H04N 5/378
USPC ......................................... 348/308, 310, 311
See application file for complete search history.

(56) References Cited

U.S. PATENT DOCUMENTS 6,307,243 B1   10/2001  Rhodes
(Continued)

FOREIGN PATENT DOCUMENTS

CN   101047796 A   10/2007
(Continued)

OTHER PUBLICATIONS

Y. Chen et al.: "High-Speed CMOS Image Sensor Circuits With In Situ Frame Storage" IEEE Transactions on Nuclear Science, IEEE Service Center, New York, NY, US LNKD-DOI:10.1109/TNS.2004. 832584, vol. 51, No. 4, Aug. 1, 2004, pp. 1648-1656 (XP011116239, ISSN: 0018-9499).

(Continued)

*Primary Examiner* — Aung S Moe
*Assistant Examiner* — Amy Hsu
(74) *Attorney, Agent, or Firm* — Sughrue Mion, PLLC

(57)  ABSTRACT

A pixel area with a two-dimensional array of pixels (10) each including a photodiode and a memory area (3a) on which memory sections for holding signals produced by the pixels for continuously recordable frames are separately provided on a semiconductor substrate. All the pixels simultaneously perform a photocharge storage operation, and the signals produced by the photocharge storage are extracted in parallel through mutually independent pixel output lines (14). In a plurality of memory sections connected to one pixel output line, a sample-and-hold transistor of a different memory section is turned on for each exposure cycle so as to sequentially hold signals in a capacitor of each memory section. After the continuous imaging is completed, all the pixel are sequentially read. Unlike CCD cameras, the present sensor does not simultaneously drive all the gate loads. Therefore, the sensor consumes less power yet can be driven at high speeds. The separation between the memory area and pixel area prevents signals from deterioration due to an intrusion of excessive photocharges. As a result, the sensor can perform imaging operations at higher speeds than ever before and yet capture images with higher qualities.

27 Claims, 11 Drawing Sheets

(51) Int. Cl.
*H04N 5/3745* (2011.01)
*H04N 5/378* (2011.01)

(56) References Cited

U.S. PATENT DOCUMENTS

| | | | |
|---|---|---|---|
| 6,429,036 | B1 | 8/2002 | Nixon et al. |
| 6,787,749 | B1* | 9/2004 | Zhou et al. ................. 250/208.1 |
| 6,985,181 | B2* | 1/2006 | Ewedemi et al. .............. 348/294 |
| 7,139,025 | B1* | 11/2006 | Berezin ......................... 348/308 |
| 7,639,296 | B2* | 12/2009 | Mabuchi ....................... 348/308 |
| 7,956,912 | B2* | 6/2011 | Berezin ......................... 348/297 |
| 2003/0052252 | A1* | 3/2003 | Sugiyama et al. ......... 250/208.1 |
| 2003/0052983 | A1 | 3/2003 | Altree |
| 2003/0081134 | A1* | 5/2003 | Luo et al. ...................... 348/308 |
| 2003/0206236 | A1* | 11/2003 | Levantovsky ................. 348/310 |
| 2004/0125093 | A1* | 7/2004 | Rutman et al. ................ 345/204 |
| 2005/0173618 | A1* | 8/2005 | Sugiyama et al. ......... 250/208.1 |
| 2005/0174612 | A1* | 8/2005 | Sugiyama et al. ............ 358/482 |
| 2006/0044627 | A1* | 3/2006 | Sato et al. ..................... 358/474 |
| 2006/0221414 | A1* | 10/2006 | Yukawa ........................ 358/513 |
| 2007/0024727 | A1* | 2/2007 | Berezin ......................... 348/308 |
| 2007/0273772 | A1* | 11/2007 | Shirai ........................ 348/223.1 |
| 2008/0043119 | A1* | 2/2008 | Mabuchi ................. 348/231.99 |

FOREIGN PATENT DOCUMENTS

| | | |
|---|---|---|
| EP | 1 078 390 B1 | 5/2006 |
| JP | 63-174356 A | 7/1988 |
| JP | 2001-345441 A | 12/2001 |
| JP | 2002-512461 T | 4/2002 |
| JP | 2006-101479 A | 4/2006 |
| JP | 2006-245522 A | 9/2006 |
| JP | 2006-333493 A | 12/2006 |
| JP | 2007-166581 A1 | 6/2007 |
| KR | 10-2006-0058636 A | 5/2006 |
| KR | 10-2006-0119063 A | 11/2006 |

OTHER PUBLICATIONS

Japanese Office Action dated Sep. 20, 2011, issued in corresponding Japanese Patent Application No. 2009-531123.

Chinese Notification for Filing Divisional Application dated Nov. 14, 2011, issued in corresponding Chinese Patent Application No. 200880105558.9.

Yasushi Kondo et al., "Development of "Hypervision HPV-1" High-speed Video Camera", Shimadzu Review, Sep. 30, 2005, pp. 79-86, vol. 62, Nos. 1-2.

Korean Office Action dated May 4, 2011, issued in corresponding Korean Patent Application No. 10-2010-7003063.

European Office Action dated Dec. 27, 2011, issued in corresponding European Patent Application No. 08 829 399.8.

Chinese Office Action dated Aug. 3, 2012 issued in corresponding Chinese Patent Application No. 200880105558.9.

Communication Under Rule 71(c) EPC dated Jun. 5, 2013 issued in corresponding European Patent Application No. 08 829 399.8.

Brief Communication in corresponding European Patent Application No. 08829399.8 dated May 22, 2013.

Office Action in corresponding Chinese Patent Application No. 200880105558.9 dated Mar. 5, 2013.

Office Action in corresponding Taiwanese Patent Application No. 097134047 dated Jan. 24, 2013.

Chinese Office Action issued Aug. 2, 2013 in Chinese Patent Application No. 200880105558.9.

Notice of Rejection dated Jun. 3, 2013 issued in corresponding Taiwan Patent Application No. 97134047.

Chinese Office Action issued Dec. 3, 2013 in Chinese Patent Application No. 200880105558.9.

Chinese Office Action issued Feb. 28, 2014 in Chinese Patent Application No. 200880105558.9.

* cited by examiner

Fig. 6
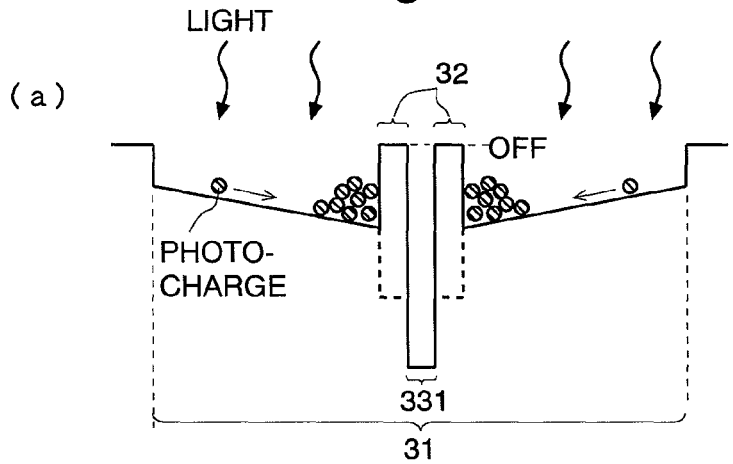
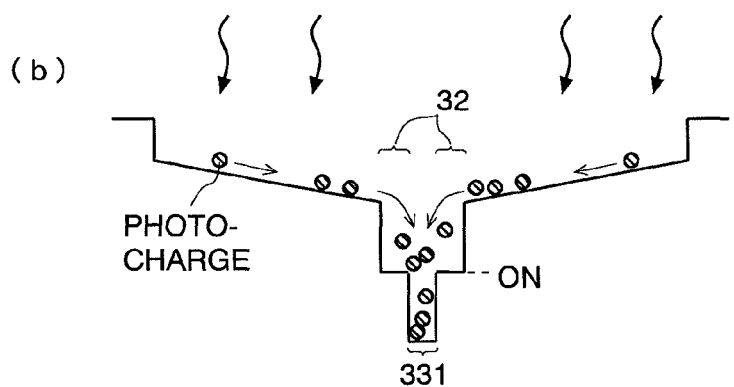
Fig. 7
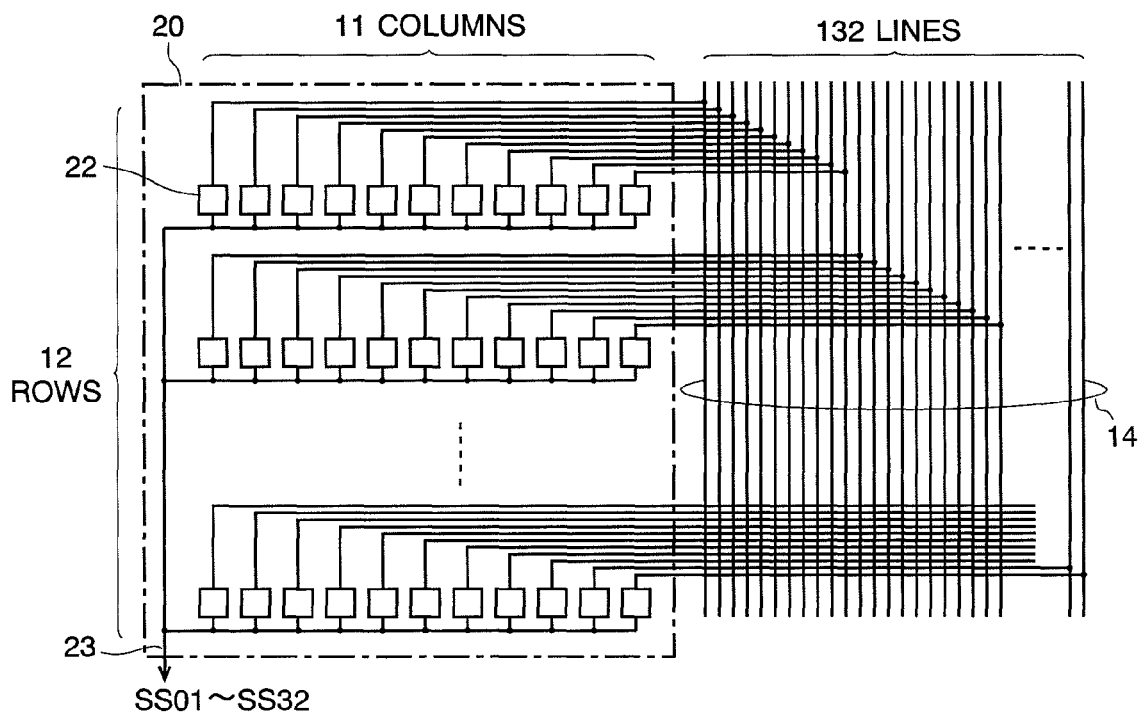

SOLID-STATE IMAGE SENSOR

TECHNICAL FIELD

The present invention relates to a solid-state image sensor and, more specifically, to a solid-state image sensor capable of high-speed operations suitable for taking images of high-speed phenomena such as destructions, explosions and combustions.

BACKGROUND ART

High-speed imaging devices (high-speed video cameras) for taking consecutive images of high-speed phenomena such as explosions, destructions, combustions, collisions and discharges for only a short period of time have been conventionally developed (for example, refer to Non-Patent Document 1 and other documents). Such high-speed imaging devices need to perform an ultrahigh-speed imaging operation that exceeds a level of approximately one million images per second. Accordingly, they use solid-state image sensors capable of high-speed operations, which have special structures different from those of the imaging devices used in normal video cameras, digital cameras and similar devices.

One example of this type of solid-state image sensor is disclosed in Patent Document 1 and other documents, which is referred to as an in-situ storage image sensor. An outline of this image sensor is as follows: A storage CCD, which also serves for the transfer of a specified number of recorded images (frames), is provided for each photodiode as a photo-receiver. During an imaging operation, pixel signals resulting from photoelectric conversion by the photodiode are sequentially transferred to the storage CCD. After the imaging operation is completed, the pixel signals corresponding to the specified number of images stored in the storage CCD are collectively read, and the specified number of recorded images are reproduced outside the image sensor. During the imaging operation, pixel signals exceeding the specified number of images are discarded from the oldest ones. Thus, the latest set of pixel signals corresponding to the specified number of images are held in the storage CCD. This means that, when the transfer of pixel signals to the storage CCD is suspended at the completion of the imaging operation, one can obtain the latest series of images ranging from the completion of the imaging operation back through a period of time corresponding to the specified number of images.

Thus, unlike general types of image sensors that require pixel signals to be extracted every time a set of pixel signals corresponding to one frame is obtained, the in-situ storage image sensor is characterized by its capability of acquiring a plurality of consecutive images at extremely high speeds. However, the in-situ storage image sensor has the following problems.

(1) The aforementioned in-situ storage image sensor inherently consumes a large amount of power. This is because the gate electrodes and signal lines, both having high capacitive loads, must be simultaneously driven during the process of transferring signal charges to the CCD, and also because the voltage amplitude of the gate-driving signal is large. Attempting to increase the drive speed for higher imaging speeds would additionally increase the power consumption and possibly cause heat generation that exceeds the upper limit of heat radiation. Furthermore, the high capacitive load may cause waveform distortion of the drive signal (e.g. unsharpening of the waveform), in which case the attempt of increasing the imaging speed may totally prevent the charge transfer.

(2) In the aforementioned in-situ storage image sensor, the storage CCDs are located between the neighboring photodiodes on a semiconductor chip. Therefore, when a large amount of phortocharges are generated by an incidence of strong light onto a photodiode, some of the photocharges may flow into the storage CCD. As a result, various problems can occur, such as the deterioration of signal-to-noise (S/N) ratio of the images. In the worst case scenario, the image will be doubly produced.

(3) Even during the stand-by period for the next signal-reading cycle, the storage CCDs receive false signals due to dark charges. This may possibly lower the S/N ratio of the images.

Meanwhile, in the field of CMOS image sensors, a device disclosed in Patent Document 2 has been known. In this image sensor, a plurality of capacitors acting as memory elements are provided within each pixel so that the photocharges produced by the photodiode can be consecutively stored, for each frame, in a different set of memory capacitors. Although this device can continuously record a few to several frames, it cannot perform the continuous imaging operation over such a large number of frames that the aforementioned high-speed imaging device is intended for. Using more memory capacitors to increase the number of continuously recordable frames results in a higher capacitive load of the signal lines extending from the detection node storing the charges produced by the photodiode, which makes it difficult to raise the operation speed. Furthermore, the area of the photodiode within each pixel inevitably decreases, which lowers the aperture ratio and accordingly deteriorates the sensitivity.

Patent Document 1: Japanese Unexamined Patent Application Publication No. 2001-345441
Patent Document 2: Japanese Unexamined Patent Application Publication (Translation of PCT Application) No. 2002-512461
Non-Patent Document 1: Kondo et al., "Kousokudo Bideo Kamera HyperVision HPV-1 no Kaihatsu (Development of "HyperVision HPV-1" High-Speed Video Camera)", Shimadzu Hyouron (Shimadzu Review), Shimadzu Hyouron Henshuu-bu, Sep. 30, 2005, Vol. 62, No. 1/2, pp. 79-86

DISCLOSURE OF THE INVENTION

Problem to be Solved by the Invention

The present invention has been developed in view of these problems, and its main objective is to provide a solid-state image sensor capable of performing continuous imaging operations at extremely high speeds yet with low power consumption. Another objective of the present invention is to provide a solid-state image sensor in which the image quality is enhanced by improving the S/N ratio and/or dynamic range of the pixel signals obtained by a continuous high-speed imaging operation.

Means for Solving the Problems

A solid-state image sensor according to a first aspect of the present invention aimed at solving the previously described problems is characterized by including:

a) a pixel area in which a plurality of pixels each including a photoelectric conversion element for receiving light and producing photocharges are arranged; and b) a memory area provided separately from the pixel area and having a plurality of memory sections for holding output signals respectively corresponding to the pixels within the pixel area;

where a pixel output line independently extends from each pixel within the pixel area to the memory area, and the plurality of memory sections are respectively connected to the pixel output lines.

The solid-state image sensor according to the first aspect of the present invention has a CMOS structure. The photoelectric conversion element may be, for example, a photodiode, and more preferably an embedded photodiode. The memory section may use a capacitor to hold output signals from each pixel.

In the solid-state image sensor according to this aspect of the present invention, a pixel output line independently extends from each pixel within the pixel area to the memory area, and the plurality of memory sections are respectively connected to the pixel output lines. Therefore, the signals corresponding to the charges obtained by storing photocharges produced by the photoelectric conversion elements of the pixels can be sequentially transferred through the pixel output lines, which are respectively provided for each pixel, to be held in the memory sections.

Accordingly, it is possible to continuously acquire as many analogue signals as the number of memory sections and, after the signal acquisition is completed, sequentially read the signals from each memory section and process them.

That is, although the solid-state image sensor according to the first aspect of the present invention includes a plurality of memory sections respectively corresponding to the pixels, it is unnecessary to simultaneously drive all the gate loads in the process of holding new signal charges as in the case of the conventional in-situ storage image sensor using a storage CCD. Accordingly, it has low power consumption and generates less heat even when driven at high speeds. Its low capacitive load reduces the magnitude of distortion of the drive waveform even during the high-speed driving, thus enabling signals to be assuredly extracted from the pixels to the memory sections.

Since the pixel area and memory area are separated, the number of memory sections corresponding to one pixel can be increased without affecting the other design factors, e.g. the number of pixels within the pixel area, the area of the light-receiving surface of the photoelectric conversion element, and the overall size of the pixel area. Accordingly, it is possible to provide an adequately large number of frames for continuous high-speed imaging operations.

Even if an excessive amount of photocharges are produced by an incidence of strong light onto the photoelectric conversion element, the photocharges cannot reach the memory sections since the pixel area and memory area are separated. The generation of dark charges during the stand-by period until the next signal-reading cycle can be avoided by designing the memory sections so that they holds signals by a capacitor having a double polysilicon structure or stack structure. These techniques improve the S/N ratio of the signals, which enhances, for example, the quality of the images reproduced from the read signals.

In the solid-state image sensor according to the first aspect of the present invention, the plurality of memory sections may each include at least one memory element and has a gate means provided between each memory element and the pixel output line. By this configuration, a signal extracted from each pixel to the pixel output line can be selectively stored in any one of the memory elements.

In the solid-state image sensor according to the first aspect of the present invention, each pixel within the pixel area may include: a transfer element for transferring the photocharges produced by the photoelectric conversion element to a detection node for converting electric charge signals to voltage signals; a buffer element, provided between the detection node and the pixel output line of each pixel, for sending signals from the detection node to the pixel output line; and a reset element for resetting at least the photoelectric conversion element and the detection node.

A solid-state image sensor according to a second aspect of the present invention aimed at solving the previously described problems is characterized by including:

a) a photoelectric conversion element for receiving light and producing photocharges;

b) a transfer element for transferring the photocharges produced by the photoelectric conversion element to a detection node for converting electric charge signals to voltage signals;

c) a buffer element for sending an output signal from the detection node to the pixel output line;

d) a reset element for resetting at least the photoelectric conversion element and the detection node; and e) a plurality of memory sections for holding the output signal sent from the same buffer element through the pixel output line, where the photoelectric conversion element, the transfer element, the buffer element and the reset element form one pixel, a plurality of the pixels are arranged in a two-dimensional array within a pixel area, and the plurality of memory sections are integrated for each pixel and placed within a memory area provided separately from the pixel area.

In the solid-state image sensors according to the first and second aspects of the present invention, the detection node may be, for example, a floating region (or floating diffusion) formed by a diffusion layer. The transfer element and the reset element may respectively consist of a transistor, and the buffer element may be a source follower amplifier consisting of one or more transistors.

In the solid-state image sensor according to the second aspect of the present invention, the buffer element provided for each pixel separates the pixel output line from the detection node. Therefore, even if a larger number of memory sections are connected to the same pixel output line to increase the number of frames for the continuous imaging operation, the photocharge storage operation will not be affected. Accordingly, the number of memory sections corresponding to one pixel can be increased to provide an adequate number of continuously recordable frames.

In the solid-state image sensor according to the second aspect of the present invention, the photoelectric conversion element, transfer element, buffer element and reset element form one pixel, a plurality of the pixels are arranged in a two-dimensional array within a pixel area, and the plurality of memory sections are integrated for each pixel. This configuration allows the memory sections to be placed within a memory area separated from the pixel area. Therefore, as in the case of the solid-state image sensor according to the first aspect of the present invention, it is possible to obtain the previously described effects resulting from the separation of the pixel area and memory area.

In the solid-state image sensors according to the first and second aspects of the present invention, each pixel within the pixel area may preferably include at least one charge storage element for storing photocharges overflowing from the photoelectric conversion element via the transfer element or from the detection node during the operation of storing photocharges. The charge storage element may be a capacitor.

The photocharges produced by the photoelectric conversion element are held by the capacitance inside the photoelectric conversion element. In the signal-reading process, those photocharges are conveyed through the transfer element to the detection node, such as a floating diffusion, and converted to voltage signals. To raise the photoelectric conversion gain and improve the light sensitivity, the floating diffusion should desirably have a low conversion capacitance. However, a floating diffusion with a low conversion capacitance cannot deal with a large amount of signal charges. Furthermore, the photocharges overflowing from the photoelectric conversion will be discarded and not used, which will eventually lower the dynamic range. To solve these problems, the charge storage element for storing photocharges overflowing from the photoelectric conversion element via the transfer element or from the detection node is provided, whereby an excessive amount of photocharges produced by an incidence of strong light will not be discarded but temporarily stored in the charge storage element to be reflected in the signals.

It is also possible to provide a storage transistor between the detection node and the charge storage element so that the charge storage element, which acts as a portion of the detection node in the process of reading signals after an overflow, can be disconnected in the process of reading signals before an overflow. In this case, when the amount of signal charges is small, the conversion capacitance of the detection node (floating diffusion) can be decreased to raise the photoelectric conversion gain. When the amount of signal charges is large, the signal after an overflow is detected by the combined capacitance of the charge storage element and the floating diffusion. Thus, when a large amount of photocharges are produced by an incidence of strong light, the photocharges are utilized without being discarded, whereby a wide dynamic range is realized.

In the solid-state image sensor according to the first aspect of the present invention, the plurality of pixels may be linearly arranged within the pixel area. However, it is particularly preferable to arrange them in a two-dimensional array. That is, the pixels may be arranged in N rows and M columns within the pixel area, where both N and M are integers greater than one.

Since one independent pixel output line is provided for each pixel, it is possible to perform a reading operation that simultaneously transfers signals from all the pixels to the memory sections. Accordingly, in the solid-state image sensors according to the first and second aspects of the present invention, a common control signal may be supplied to all the pixels so that an operation of storing photocharges in each pixel and an operation of reading signals from each pixel through the pixel output line are simultaneously performed at all the pixels.

By this method, the operation of extracting signals from the pixels to the memory sections can be completed in a short period of time, so that the cycle of storing photocharges and reading signals can be repeated at high speeds. The method is also advantageous to improving the sensitivity since it provides a relatively long operation period for receiving light and storing the produced photocharges within one cycle.

In the solid-state image sensors according to the first and second aspects of the present invention, it is preferable that a control signal is supplied to each pixel and each memory section so that an operation of storing photocharges in each pixel and an operation of reading signals from each pixel through the pixel output line are simultaneously repeated at all the pixels, and the signal transferred through each pixel output signal for every signal-reading operation is sequentially held by the plurality of memory sections.

By this method, the signals (pixel signals) obtained by an imaging operation in the pixels at a given point in time can be collectively transferred to the memory sections, so that the next imaging cycle can be immediately performed. Accordingly, the continuous imaging operation can be performed at high speeds.

In the solid-state image sensors according to the first and second aspects of the present invention, it is preferable that each of the plurality of memory sections corresponding to one pixel has a plurality of memory elements capable of independently holding an output signal from the pixel, and a control signal is supplied to each pixel and each memory section so that a noise component remaining when the photoelectric conversion element and the detection node are reset in each pixel, and a signal corresponding to the charge resulting from the storage of the photocharges, are held by different memory elements in the same memory section within one cycle of the photocharge storage operation.

In this configuration, the influence of inherent noises originating from various elements can be reduced, for example, by performing an operation for subtracting the noise components from the signals by an external system (or by a built-in operation means), whereby pixel signals with higher levels of purity (i.e. higher S/N ratios) can be obtained. Therefore, this configuration is advantageous to improving the quality of the captured images.

In the solid-state image sensors according to the first and second aspects of the present invention, it is more preferable that each of the plurality of memory sections corresponding to one pixel has a plurality of memory elements capable of independently holding an output signal from the pixel, and a control signal is supplied to each pixel and each memory section so that a noise component remaining when the photoelectric conversion element and the detection node are reset in each pixel, a signal corresponding to the charges before an overflow into the charge storage element occurs during the process of storing photocharges, and a signal corresponding to the charges after an overflow into the charge storage element occurs during the process of storing photocharges, are held by different memory elements in the same memory section within one cycle of the photocharge storage operation.

By this configuration, it is possible to an excessive amount of photocharges produced by an incidence of strong light will not be wasted but reflected in the signals to widen the dynamic range of the signals while reducing the influence of inherent noises originating from various elements. Therefore, the configuration is further advantageous to improving the quality of the captured images and can provide useful information, for example, in a physical analysis of high-speed phenomena.

In the solid-state image sensors according to the first and second aspects of the present invention, it is possible that the pixel output lines extending from a plurality of pixels belonging to the same column or row are integrated together for each column or row and arranged in a vertical direction or horizontal direction.

It is also possible that the pixel area is divided into plural sections in the vertical direction and/or horizontal direction, the pixel output lines extending from a plurality of pixels belonging to the same column or row within each of the pixel-area sections are integrated together for each column or row and arranged in a vertical direction or horizontal direction.

When the pixel output lines for extracting signals from the pixels are integrated for each column or row in the aforementioned manners, the plurality of pixels can be uniformly arranged within the pixel area in a balanced form, which facilitates the image processing for reproducing two-dimensional images and probably improves the image quality. Patterning the present solid-state image sensor in the production process is also facilitated.

In the solid-state image sensors according to the first and second aspects of the present invention, it is preferable that the pixel area has a rectangular planar shape, and the memory area is arranged on the outside of one or more of the four sides of the pixel area. It is also possible to divide the memory area into sections corresponding to the aforementioned pixel-area sections and arrange each of the memory-area sections on the outside of a different side of the four sides of the pixel area. By this design, the area required for the wiring of the pixel output lines can be minimized. Furthermore, for example, the entire layout of the semiconductor chip can be efficiently designed. Therefore, given the same pixel count and the same number of continuously recordable frames, the area of the semiconductor chip will be smaller, which is advantageous for cost reduction.

In the solid-state image sensors according to the first and second aspects of the present invention, the plurality of pixel output lines may be arranged on the photoelectric conversion element. Furthermore, to increase the concentration ratio, a plurality of on-chip micro-lenses approximately shaped like a partial sphere or partial cylinder may be arranged over the plurality of pixel output lines so that these lenses form images between the plurality of pixel output lines. When, as in the present case, the plurality of pixel output lines are arranged on the photoelectric conversion element and a plurality of on-chip micro-lenses are arranged so that they form images between the plurality of pixel output lines, the effective aperture ratio is prevented from deterioration and the pixel interval can be reduced. Thus, the present configuration is advantageous to increasing the pixel count or reducing the chip size.

In the solid-state image sensors according to the first and second aspects of the present invention, it is naturally possible to provide the pixel area and memory area on the same surface of the same semiconductor chip; however, there are many variations other than this one. For example, it is possible that at least the photoelectric conversion elements of the pixels are provided on the back side of the semiconductor substrate opposite from the element formation surface on which the memory area is formed, and the back side is used as a light-incidence surface.

When, as in the present case, the surface with the photoelectric conversion elements provided thereon is separated from the memory area, a wide light-receiving area can be ensured for each photoelectric conversion element, which particularly increases the quantum efficiency and aperture ratio and thereby enhances the sensitivity. Therefore, the photocharge storage time can be shortened, which is advantageous to raising the speed of continuous imaging operations. The distinct separation between the pixel area and memory area is also beneficial for improving the S/N ratio of the image signals.

As another variation of the solid-state image sensors according to the first and second aspects of the present invention, the sensor may be constructed as a three-dimensional integrated circuit with a plurality of semiconductor layers separated by an insulating layer, and the pixel area and the memory area may be formed on different semiconductor layers. As another variation, the sensor may be composed of a plurality of semiconductor integrated circuit elements, and the pixel area and the memory area may be formed on different semiconductor integrated circuit elements.

That is, the solid-state image sensors according to the first and second aspects of the present invention do not need to consist of a single semiconductor chip; it is possible to construct a sensor using a plurality of semiconductor chips arranged in their lateral direction (i.e. the extending direction of the semiconductor chips) or stacked up in their thickness direction. For the wiring between the plurality of semiconductor chips, a wire-bonding method may be used, although the publicly known flip-chip technique is recommendable since it shortens the wiring length between the chips and is advantageous to reducing the entire size of the sensor.

In the solid-state image sensors according to the first and second aspects of the present invention, the memory section may include a capacitor and a switch element for receiving an output signal received from each pixel through the pixel output line and sending the output signal into the capacitor.

EFFECT OF THE INVENTION

The solid-state image sensors according to the first and second aspects of the present invention can achieve high-speed operations while suppressing the power consumption; for example, it is possible to ensure an adequately large number of continuously recordable frames for a high-speed operation that equals or exceeds one million frames per second. Thus, the imaging operation can be performed at higher speeds than in the case of the conventional solid-state image sensors, and useful information for the analysis of high-speed phenomena can be obtained. Since the deterioration of signals due to an intrusion of dark charges or excessive photocharges is alleviated, the SN ratio is improved, so that the images obtained by the high-speed imaging operation will have better qualities.

BRIEF DESCRIPTION OF THE DRAWINGS

FIG. 6 is a schematic potential diagram at the vertical section indicated by the arrowed line A-A' in FIG. 5.

FIG. 7 is a schematic configuration diagram of one memory section unit corresponding to 132 pixels vertically arranged in the solid-state image sensor of the present embodiment.

EXPLANATION OF NUMERALS

1 . . . Semiconductor Substrate
2, 2a, 2b . . . Pixel Area
3a, 3b . . . Memory Area
4a, 4b . . . Vertical Scan Circuit Area
5a, 5b . . . Horizontal Scan Circuit Area
6a, 6b . . . Current Source Area
10 . . . Pixel
11 . . . Photoelectric Conversion Area
12 . . . Pixel Circuit Area
13 . . . Wiring Area
14, 141 . . . Pixel Output Line
15 . . . Drive Line
20 . . . Memory Section Unit
22 . . . Memory Section
23, 23a-23d . . . Output Line
24, 24a-24d . . . Memory Element
25, 25a-25d . . . Capacitor
26, 26a-26d . . . Sampling Transistor
27, 27a-27d . . . Reading Transistor
31 . . . Photodiode
32 . . . Transfer Transistor
33, 331, 332 . . . Floating Diffusion
333 . . . Metallic Wiring
34 . . . Storage Transistor
35 . . . Reset Transistor
36 . . . Storage Capacitor
37, 40 . . . Transistor
38, 41 . . . Selection Transistor
39 . . . Current Source
43 . . . Source Follower Amplifier
50 . . . Memory Section Unit Block
VSR1-104 . . . Vertical Shift Register
HSR1-320 . . . Horizontal Shift Register Best Mode For Carrying Out The Invention A solid-state image sensor which is an embodiment of the present invention is hereinafter described with reference to the drawings.

Figure 1:
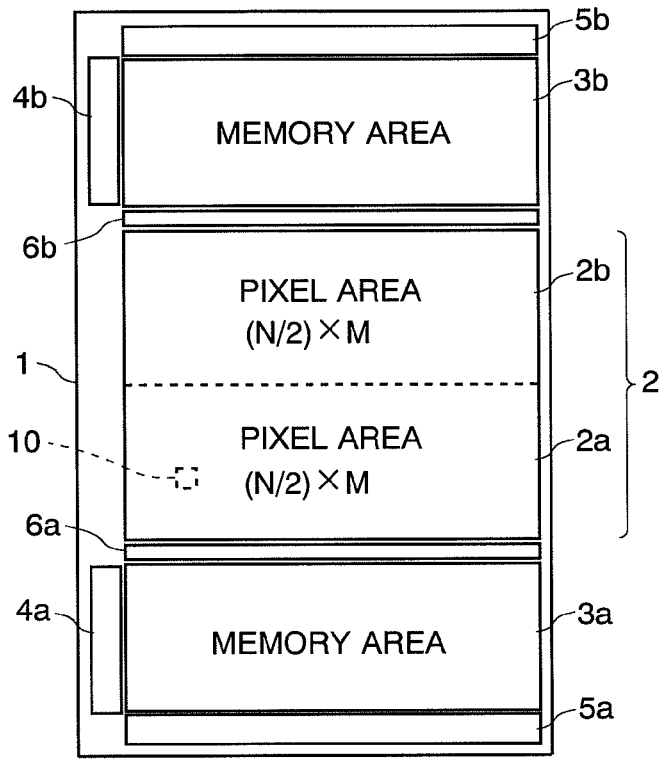
FIG. 1 is a plan view showing the schematic layout on a semiconductor chip of a solid-state image sensor which is an embodiment of the present invention.
Figure 3:
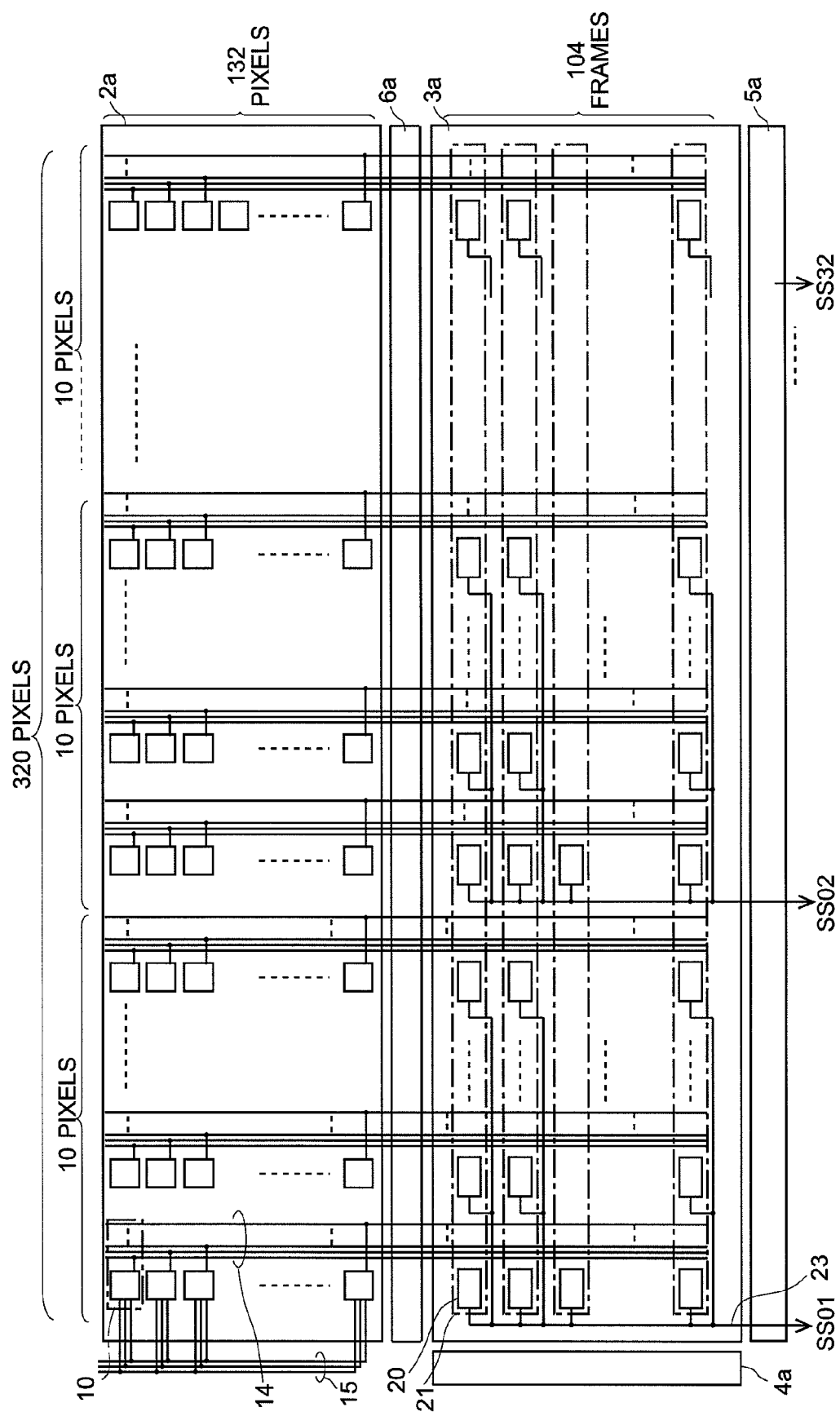
FIG. 3 is a block configuration diagram of the main portion in the solid-state image sensor of the present embodiment.

An overall configuration and structure of the solid-state image sensor according to the present embodiment is initially described. FIG. 1 is a plan view showing the schematic layout on a semiconductor chip of the solid-state image sensor of the present embodiment, and FIG. 3 is a block diagram of the main portion in the solid-state image sensor of the present embodiment.

As shown in FIG. 1, in the present solid-state image sensor, the pixel area 2 (2a and 2b) for receiving light and producing signals for each pixel and the memory areas 3a and 3b for holding the signals for a predetermined number of frames are not intermixed but completely separated from each other on the semiconductor substrate 1 so that each area forms a definite block. Within the rectangular pixel area 2, a total of N×M pixels 10 consisting of N rows and M columns are arranged in a two-dimensional array. This pixel area 2 is divided into the first pixel area 2a and second pixel area 2b, each of which has (N/2)×M pixels arranged inside. The first pixel area 2a and second pixel area 2b each correspond to the pixel-area section in the present invention.

Below the first pixel area 2a, a first memory area 3a is provided across a first current source area 6a having a small area, while a second memory area 3b is provided above the second pixel area 2b across a second current source 6b which also has a small area. The first memory area 3a and second memory area 3b each correspond to the memory-area section in the present invention. The first and second memory areas 3a and 3b each include a first or second vertical scan circuit area 4a or 4b and a first or second horizontal scan circuit area 5a or 5b, each circuit area being provided with circuits such as shift resisters and decoders for controlling the reading of signals from the memory area 3a or 3b. That is, this structure is nearly symmetrical with respect to a horizontal border line extending approximately through the center of the pixel area 2 to divide this area into upper and lower sections. The structure and operation of the upper and lower sections are basically identical. Therefore, the following description is mainly concerned with the structure and operation of the lower section, i.e. the first pixel area 2a, first memory area 3a, first vertical scan circuit area 4a and first horizontal scan circuit area 5a.

The number of pixels, i.e. the values of N and M, can be arbitrarily determined. Increasing these values improves the image resolution but also unfavorably results in either an increase in the entire chip area or a decrease in the chip area per one pixel. In the present example, N=264 and M=320; these are reasonable values for the solid-state image sensor to be used for high-speed imaging. Accordingly, the number of pixels arranged in each of the first and second pixel areas 2a and 2b is 132×320 pixels, as shown in FIG. 3.

Figure 2:
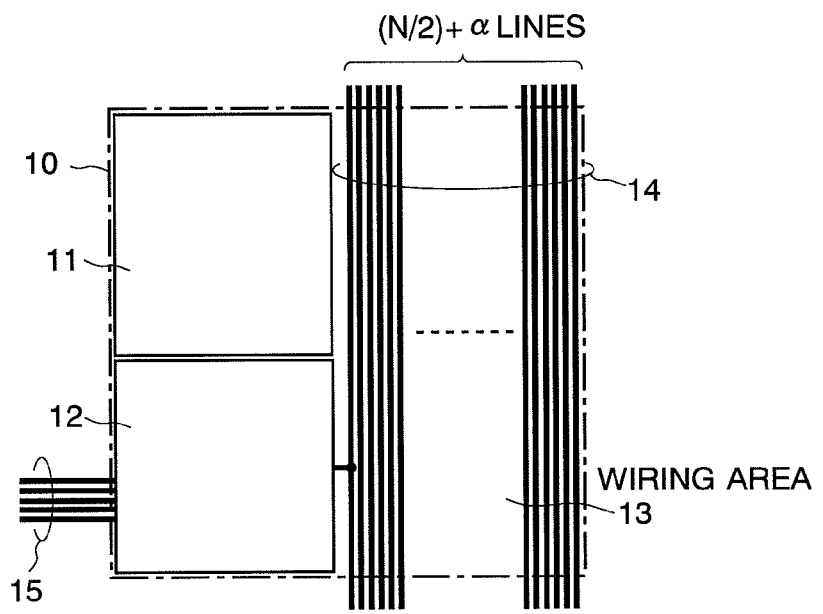
FIG. 2 is a plan view showing the schematic layout of one pixel within a pixel area in the solid-state image sensor of the present embodiment.

FIG. 2 is a plan view showing the schematic layout of one pixel 10 within the pixel area 2 (2a and 2b). One pixel 10 occupies roughly one square area, which is further divided into three areas, i.e. the photoelectric conversion area 11, pixel circuit area 12 and wiring area 13. In the wiring area 13, a bundle of vertically extending (N/2)+α pixel output lines 14 are provided. The value of α may be zero, in which case the number of pixel output lines passing through one wiring area 13 in the present example is 132. However, when a large number of wirings (e.g. aluminum wirings or other kinds of metal wirings) parallel to each other are created, the width of the wires on both ends as well as their parasitic capacitances normally tend to be different. To address these problems, a dummy wire is additionally provided at each end of the 132 pixel output lines which are used to actually pass the signals. In this case, α=2, so that the total number of wires passing through one wiring area 13 is 134.

Figure 4:
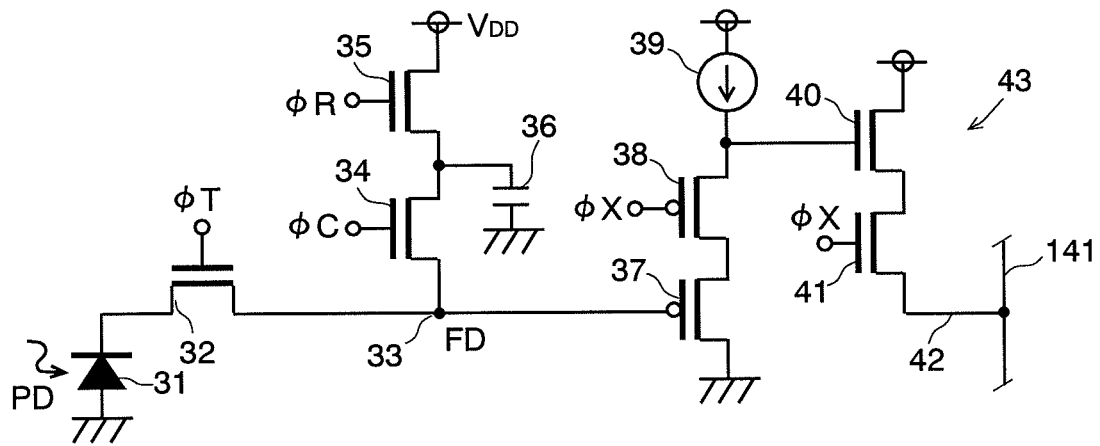
FIG. 4 is a circuit configuration diagram of one pixel in the solid-state image sensor of the present embodiment.

FIG. 4 is a circuit configuration diagram of one pixel 10 shown in FIG. 2. As shown in FIG. 4, the pixel 10 includes the following elements: a photodiode 31 for receiving light and producing photocharges (this element corresponds to the photoelectric conversion element in the present invention); a transfer transistor 32, which is located near the photodiode 31, for transferring the photocharges (this element corresponds to the transfer element in the present invention); a floating diffusion (FD) 33, which is connected to the photodiode 31 via the transfer transistor 32, for temporarily storing the photocharges (this element corresponds to the detection node in the present invention); a storage transistor 34 and storage capacitor 36 for storing charges overflowing from the photodiode 31 through the transfer transistor 32 in the process of storing photocharges (these elements correspond to the charge storage element in the present invention); a reset transistor 35 for discharging the charges stored in the floating diffusion 33 and the storage capacitor 36 (this element corresponds to the reset element in the present invention); a source follower amplifier 43 with a two-stage configuration including a pair of cascade-connected PMOS transistors 37 and 38 and another pair of cascade-connected NMOS transistors 40 and 41, for extracting charges stored in the floating diffusion 33 or in both the floating diffusion 33 and the storage capacitor 36 to the outside as voltage signals (this amplifier corresponds to the buffer element in the present invention); and a current source 39, which consists of a constant-current transistor and other components, for supplying current to the transistors 37 and 38 in the first stage of the source follower amplifier 43.

In FIG. 4, the current source 39 for supplying an electric current to the two transistors 37 and 38 in the first stage of the source follower amplifier 43 is shown within the pixel 10. Actually, it is not located within the pixel 10 but within the first current source area 6a or second current source area 6b.

Drive lines 15 for supplying control signals φT, φC, φR and φX are respectively connected to the gate terminals of the transfer transistor 32, storage transistor 34, reset transistor 35, and selection transistors 38 and 41 of the source follower amplifier 43. As shown in FIG. 3, these drive lines are common to all the pixels within the pixel area 2 (including the pixels within the second pixel area 2b).

The output 42 of the transistor 41 in the second stage of the source follower amplifier 43 is connected to one of the 132 pixel output lines 14 (i.e. the pixel output line denoted by numeral 141 in FIG. 4) provided in the aforementioned wiring area 13. Since this pixel output line 141 is provided for each pixel 10, there is only one pixel 10 (and hence one source follower amplifier 43) connected to a given pixel output line 141.

The source follower amplifier 43 functions as a current buffer for driving the pixel output line 141 at high speeds. As shown in FIG. 3, each pixel output line 141 extends from the pixel area 2a to the memory area 3a and hence acts as a considerably large capacitive load. Driving such an element at high speeds requires a large-sized transistor through which high currents can be passed. However, in order to raise the gain of photoelectric conversion to enhance the detection sensitivity, the floating diffusion 33 for converting photocharges to voltage should preferably have the smallest possible capacitance. The parasitic capacitance of the gate terminal of the transistor connected to the floating diffusion 33 causes an effective increase in the capacitance of the floating diffusion 33. Therefore, for the aforementioned reason, this transistor 37 should preferably be a small-sized transistor with a small gate input capacitance. To fulfill both the supply of high current on the output side and the low capacitance on the input side, the source follower amplifier 43 has a two-stage configuration, where a small-sized transistor is used as the transistor 37 in the first stage to reduce the input gate capacitance while large-sized transistors are used as the second-stage transistors 40 and 41 to ensure a high output current.

The selection transistor 38 in the first stage of the source follower amplifier 43 is not essential for the basic operation. However, when the second-stage selection transistor 41 is off, this selection transistor 38 can be simultaneously turned off to block the flow of current from the current source 39 into the transistor 37 and thereby suppress the consumption of electric power.

Figure 5:
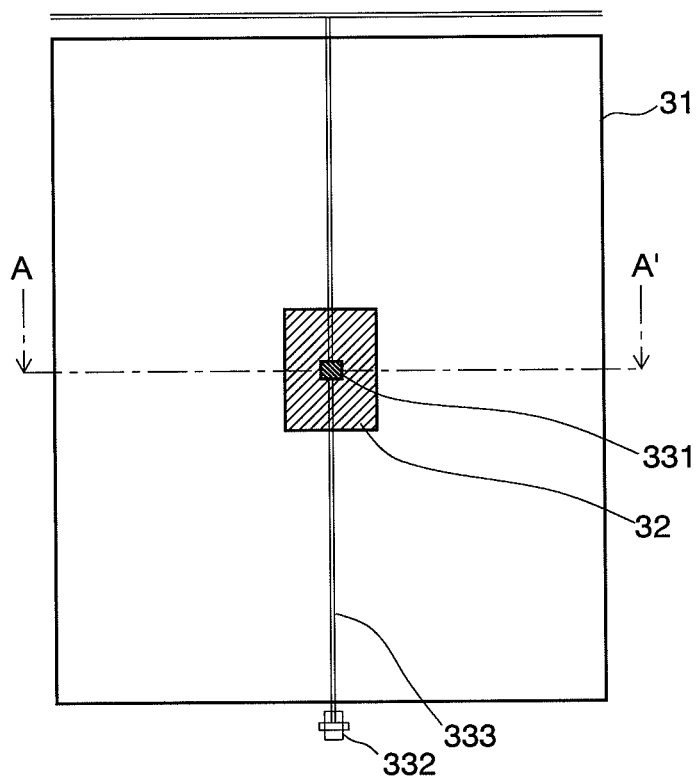
FIG. 5 is a plan view showing the schematic layout of a photoelectric conversion section in one pixel in the solid-state image sensor of the present embodiment.

FIG. 5 is a plan view showing the schematic layout of the photoelectric conversion area 11 in one pixel 10, and FIG. 6 is a schematic potential diagram at the vertical section indicated by the arrowed line A-A' in FIG. 5. The photodiode 31, which has a photo-receiving surface that is substantially rectangular, has an embedded photodiode structure. In high-speed imaging, the exposure time is extremely short. Therefore, to ensure appropriate exposure, the photodiode of each pixel 10 needs to have the largest possible photo-receiving surface so that it can receive the largest possible amount of incident light. However, increasing the area of the photo-receiving surface of the photodiode normally causes a problem relating to the time required for the photocharges to move to the floating diffusion, i.e. the detection node, particularly for the photocharges produced in the circumferential portion of the photo-receiving surface. This problem can result in a situation where the charges that cannot be transferred during the short cyclic period of the high-speed imaging are eventually wasted or cause afterimages. To address these problems, the solid-state image sensor of the present embodiment has adopted a special structure, as hereafter described, to improve the charge-transfer speed.

The floating diffusion is normally placed next to the photodiode. However, as shown in FIG. 5, the present solid-state image sensor has a small-sized floating diffusion 331 located nearly at the center of the photodiode 31, with the ring-shaped gate of the transfer transistor 32 encircling the floating diffusion 331. This layout is aimed at minimizing the moving distance of the photocharges from the circumferential portion of the photodiode 31 to the floating diffusion 331.

Furthermore, in the process of creating the photodiode 31, a gradient in the amount of doping impurities or the injection depth of impurities from the circumference of the photodiode 31 toward its center (i.e. the floating diffusion 331) is created by using a plurality of photomasks. This is to create a potential gradient that declines from the circumference of the photodiode 31 toward its center, as shown in FIG. 6(a), with an appropriate bias voltage being applied to the PN junction of the photodiode 31. Due to this intended potential gradient created by a special process, a photocharge produced by a receipt of light at a location closer to the circumference of the photodiode 31 is more rapidly accelerated toward the center. Therefore, when the transfer transistor 32 is off, the photocharges are collected around the ring-shaped gate of the transfer transistor 32, as shown in FIG. 6(a). When the transfer transistor 32 is on, the photocharges will fall into the floating diffusion 331 through the transfer transistor 32, as shown in FIG. 6(b). In any of these cases, the photocharges produced by the photodiode 31 are promptly, and with high probability, transferred to the floating diffusion 331.

Although the provision of the floating diffusion 331 at the center of the photodiode 31 offers the previously described significant advantages, this configuration causes the problem that the aperture ratio will decrease if another element, such as a storage capacitor 36 for storing photocharges that have overflowed, is placed close to the floating diffusion 331. This problem is avoided by forming a second floating diffusion 332 as a diffusion layer within the pixel circuit area 12 in addition to the aforementioned floating diffusion 331 (this floating diffusion is hereinafter called the first floating diffusion), with a wire 333 made of aluminum (Al) or other kinds of metal connecting the first floating diffusion 331 and the second floating diffusion 332 to equalize their potential. This means that the first floating diffusion 331 and the second floating diffusion 332 integrally function as a floating diffusion 33 (shown in FIG. 4) which serves as the detection node for converting electric charge signals into voltage signals.

The internal configuration of the first and second memory areas 3a and 3b is hereinafter described in detail. As shown in FIG. 3, each of the first and second memory areas 3a and 3b includes memory section units 20 whose number equals the number L of storage frames. These memory section units 20 are arrayed in the extending direction of the 132 pixel output lines 14 which are respectively connected to the vertically arranged 132 pixels 10. In the present example, the number L of storage frames, or the number of frames for continuous imaging, is 104. Accordingly, 104 pieces of memory section units 20 are vertically arranged to form a column, and 320 copies of this column are arranged horizontally. Thus, the first memory area 3a has 104×320 pieces of memory section units 20 arranged inside. The second memory area 3b also has the same number of memory section units 20.

FIG. 7 is a schematic diagram showing the internal configuration of one memory section unit 20. Each memory section unit 20 includes a total of 132 memory sections 22 forming an array with 12 rows and 11 columns. Each memory section 20 is connected to a different pixel output line 141. The pixel output lines 141 establish a one-to-one relation between the memory sections 22 and the pixels 10. The 132 memory sections 22 within one memory section unit 20 hold signals received from the 132 pixels forming one column within the pixel area 2a. Therefore, the horizontally arrayed 320 memory section units 20 (i.e. the row of memory section units denoted by numeral 21 in FIG. 3) hold pixel signals of one frame consisting of 132×320 pixels. Since these memory section units are vertically arrayed in 104 rows, the present device can hold 104 frames of pixels signals.

All the signal output lines of the 132 memory sections 22 in each memory section unit 20 are connected together to form a single output line 23. Furthermore, as shown in FIG. 3, the horizontally arranged memory section units 20 are divided into groups each consisting of ten neighboring memory section units 20. Thus, 32 groups of memory section units 20 are horizontally arranged, where the output lines of the ten memory section units 20 in each group are connected together to form one signal output line 23. The signal output lines 23 of the vertically arranged 104 memory section units 20 are also connected. The total number of signal output lines 23 equals that of the aforementioned groups, i.e. 32, and these lines are extended to the outside in parallel. Similarly, the same number of signal output lines are extended from the second memory area 3b to the outside. Thus, there are a total of 64 signal output lines, through which signals can be concurrently read.

Figure 8:
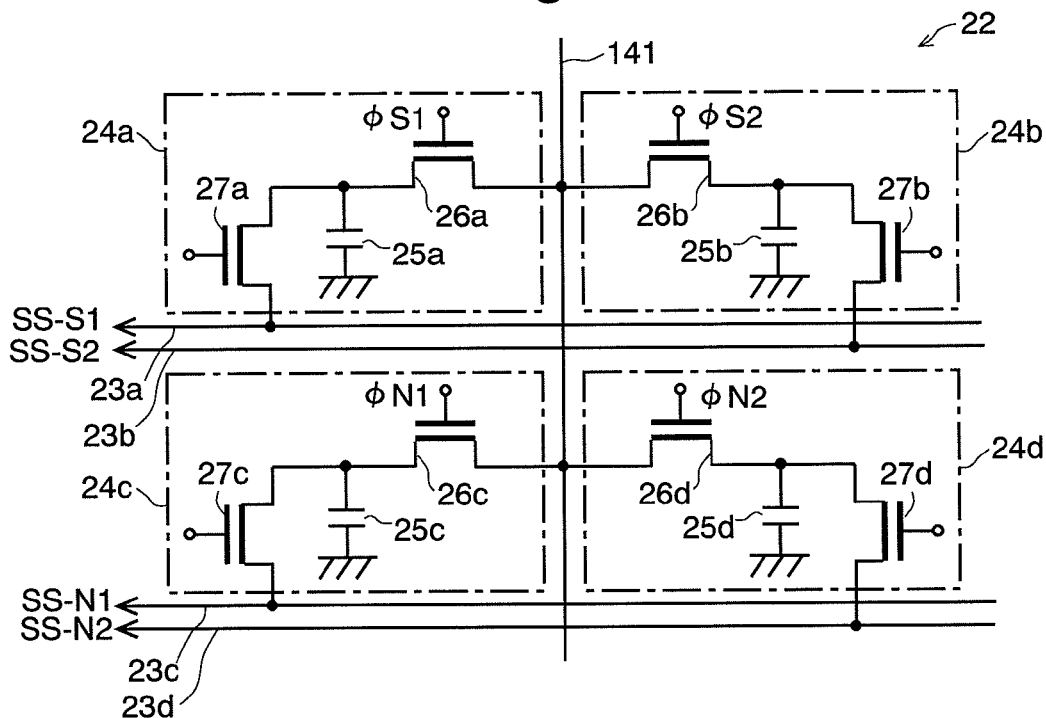
FIG. 8 is a circuit configuration diagram of one memory section in the solid-state image sensor of the present embodiment.
Figure 9:
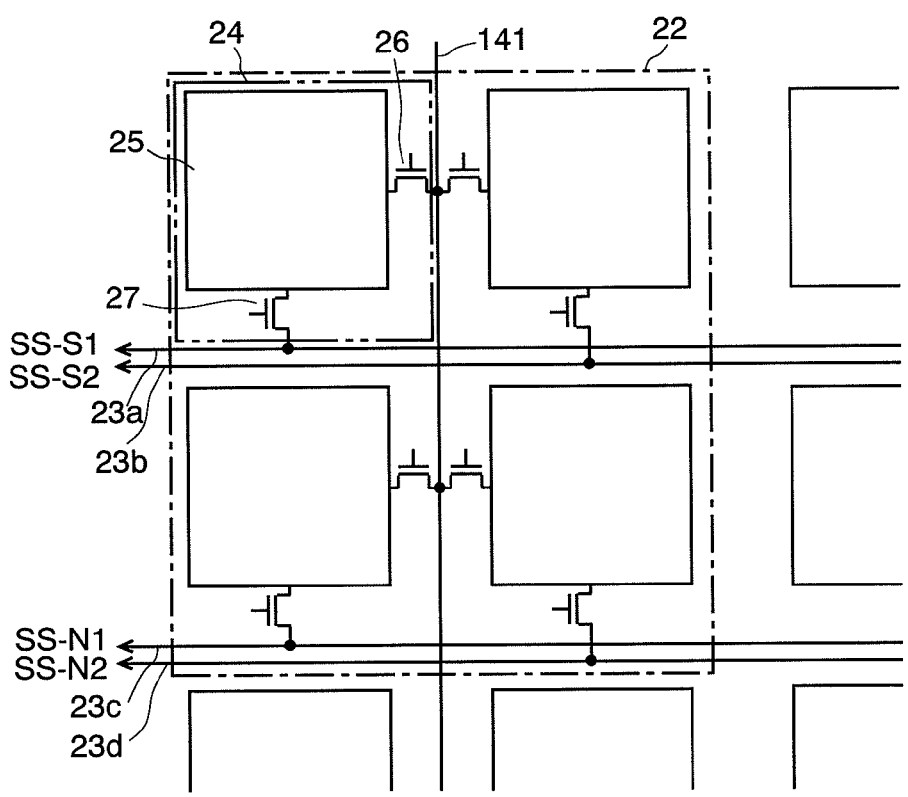
FIG. 9 is a plan view showing the schematic layout of one memory element section in the solid-state image sensor of the present embodiment.

FIG. 8 is a circuit diagram of one memory section 22, and FIG. 9 is a plan view showing the schematic layout of one memory section 22. A memory element 24 (24a-24d), which serves as the minimum memory unit, is composed of a sampling transistor 26 (26a-26d) connected to one pixel output line 141, a capacitor 25 (25a-25d) connected via the sampling transistor 26 to the pixel output line 141, and a reading transistor 27 (27a-27d) for reading an analogue voltage signal held in the capacitor 25. One memory section 22 consists of the combination of these four memory elements 24 (24a-24d). Accordingly, each memory section 22 can hold four different analogue voltage signals transferred from the same pixel through the same pixel output line 141. The signal output lines 23a, 23b, 23c and 23d via the four reading transistors 27a-27d are independent of each other, as shown in FIGS. 8 and 9. This means that the signal output line 23 shown in FIG. 7 actually consists of four lines (signal output lines 23a, 23b, 23c and 23d).

This is to independently hold a signal corresponding to the charge before an overflow, a signal corresponding to the charge after an overflow, a noise signal contained in the signal corresponding to the charge before an overflow and a noise signal contained in the signal corresponding to the charge after an overflow, in order to perform a dynamic range increasing process and noise removing process, which will be described later. However, it is not always necessary to persist on this purpose; the memory elements 24a-24d can also be used in other operational modes. For example, if the storage capacitor 36 of each pixel 10 is not used, there is no need to consider the signal after an overflow and the noise signal contained in the signal after an overflow, in which case the memory elements 24 concerned can be used to increase the number of frames for continuous imaging. As a result, the possible number of frames for continuous imaging will be doubled to 208. If the noise removal is also unnecessary, the possible number of frames for continuous imaging will be further doubled to 416.

Similar to the storage capacitor 36 in the pixel 10, the capacitors 25a-25d can be created, for example, by a double polysilicon gate structure or stack structure. Using a CCD structure to hold electric charges would cause the problem that an aliasing due to dark charges caused by thermal excitation or other factors would be added to the photo signal. The capacitors 25a-25d in the form of a double polysilicon gate structure or stack structure cause no such dark charges and hence no addition of aliasing, thus improving the SN ratio of the signals to be extracted to the outside.

The capacitors 25a-25d should preferably have a large capacitance per unit area. Accordingly, it is preferable to use an insulating film with a high dielectric constant. This choice reduces the area of the memory areas 3a and 3b and hence the chip area of the present solid-state image sensor. To increase the capacitance per unit area, the insulating films of the capacitors 25a-25d may have a non-planar structure, such as a trench structure.

Figure 10:
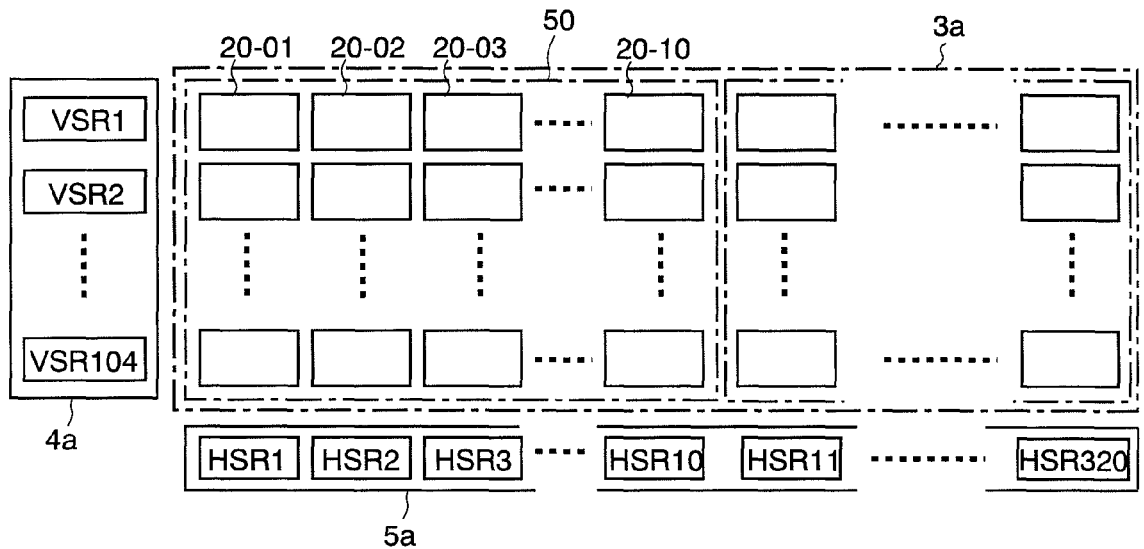
FIG. 10 is a block diagram showing a schematic configuration for sequentially reading signals held in the memory sections in the solid-state image sensor of the present embodiment.

FIG. 10 is a block diagram showing a schematic configuration for reading signals held in the memory sections within the memory area 3a through the previously described signal output line 23. There are horizontal shift registers HSR1-HSR320 provided for each vertical column of the memory section units 20 (20-01 to 20-10) arranged in a two-dimensional array, and vertical shift registers VSR1-VSR104 provided for each horizontal row. In a sequential reading, one memory section unit 20 is selected by a combination of the horizontal shift registers HSR1-HSR320 and vertical shift registers VSR1-VSR104. Within the selected memory section unit 20, the memory sections 22 are sequentially selected to extract pixel signals one after another. It should be noted that understanding the reading operation requires considering only the operation inside one memory section unit block 50 since different memory section unit blocks 50 having separate output lines 23 can be concurrently operated.

A process of performing a high-speed continuous imaging operation using the solid-state image sensor of the present invention is hereinafter described, where the process from the photoelectric conversion in each pixel 10 through the storage of the resultant signal in one memory section 22 is initially described with reference to FIGS. 11 to 14.

The solid-state image sensor of the present invention offers two different options for the drive mode: one drive mode is for a short photocharge storage time and the other for a relatively long photocharge storage time. As a rough guide, the former mode is suitable for a photocharge storage time shorter than approximately 10 μsec, i.e. when the amount of dark charges produced by the floating diffusion can be regarded as negligible. This drive mode can be preferably used when the imaging is performed at a high rate of one million frames per second or higher.

(A) Drive Mode for Short Photocharge Storage Time

Figure 11:
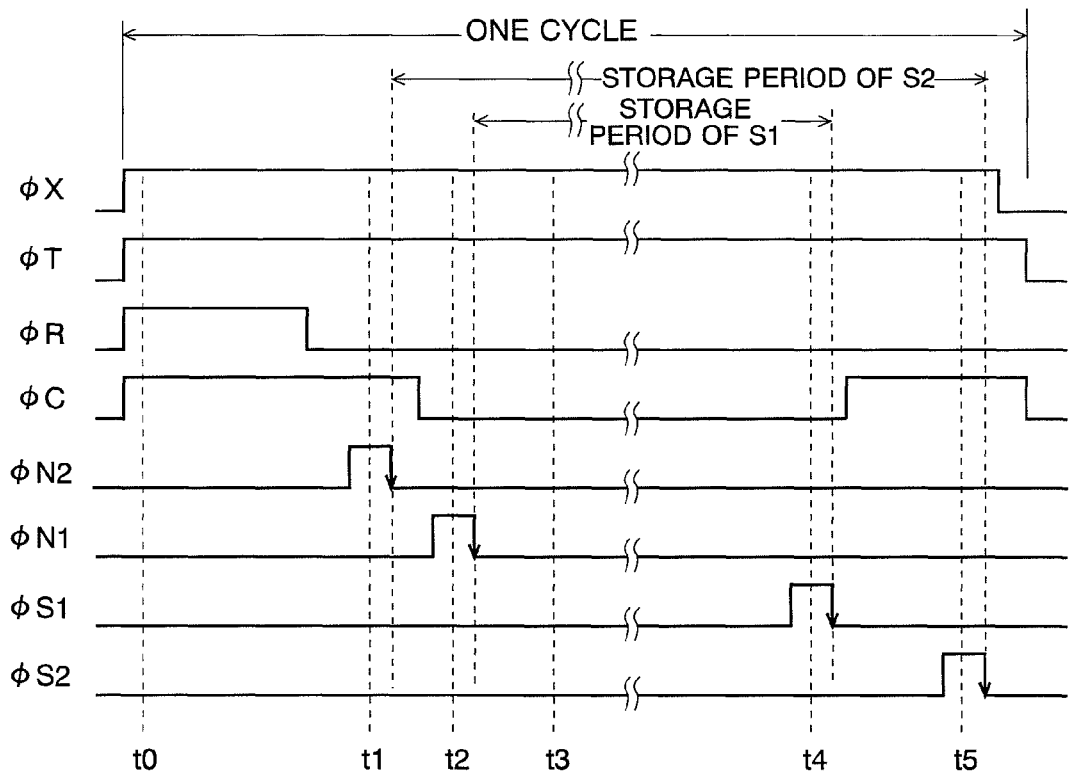
FIG. 11 is a timing chart of an operation mode of the solid-state image sensor of the present embodiment in the case where the photocharge storage time is short.
Figure 12:
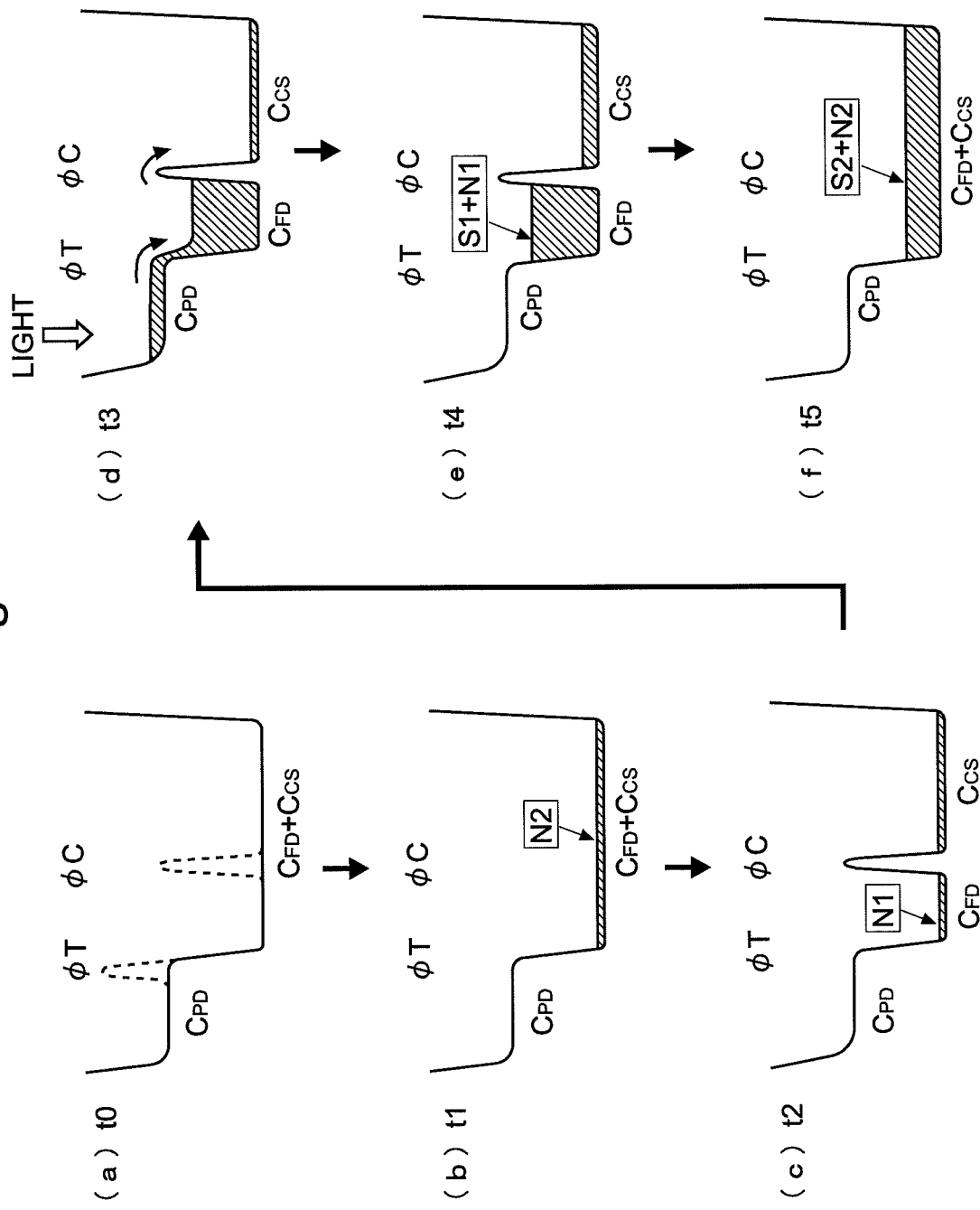
FIG. 12 is a schematic potential diagram inside each pixel during the operation shown in FIG. 11.
Figure 14:
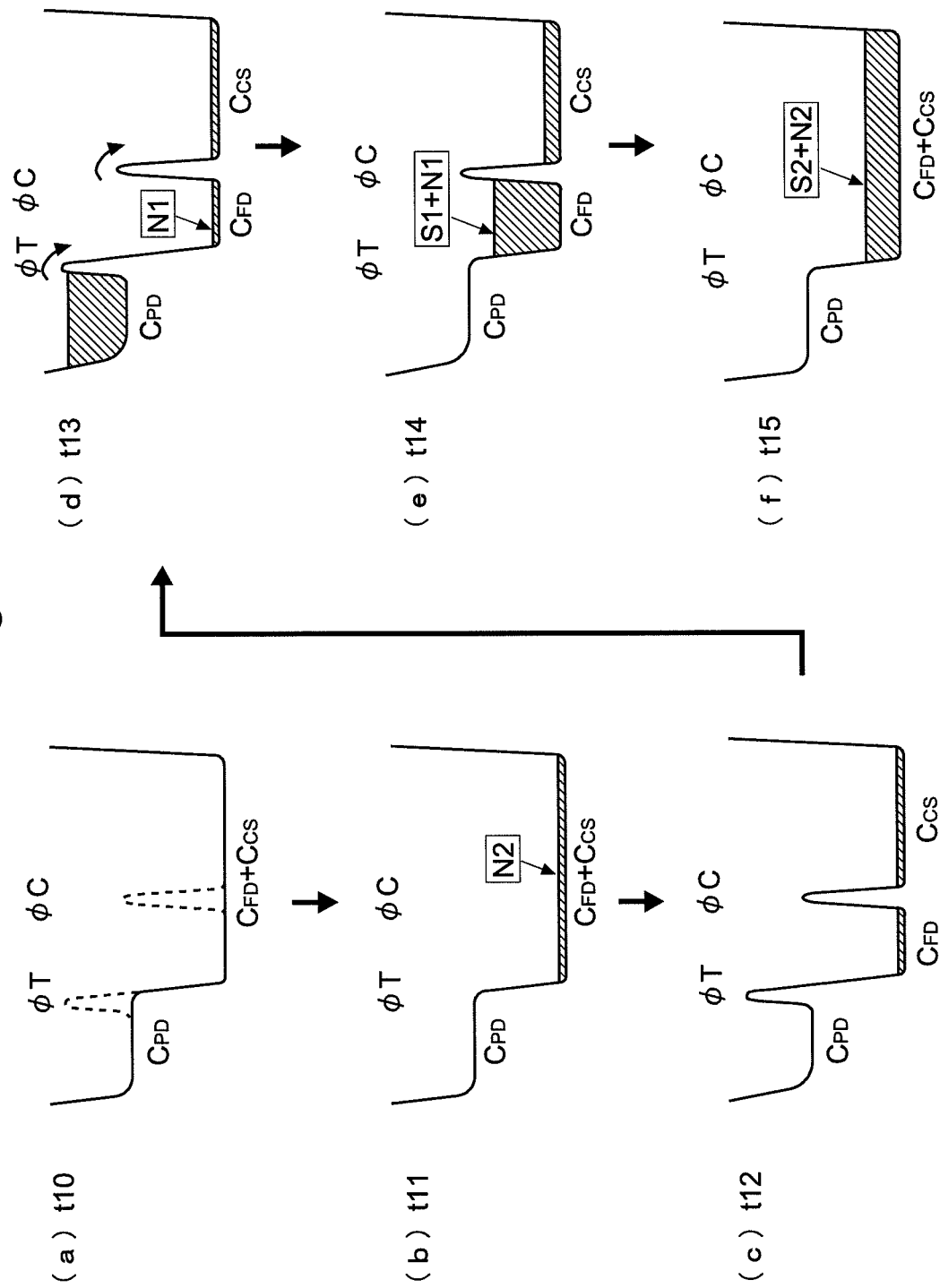
FIG. 14 is a schematic potential diagram inside each pixel during the operation shown in FIG. 13.

FIG. 11 is a drive timing chart of the operation mode for a short photocharge storage time, and FIG. 12 is a schematic potential diagram inside the pixel 10 during this drive mode. In FIG. 14 (and in FIG. 14 to be mentioned), $C_{PD}$, $C_{FD}$ and $C_{CS}$ denote the capacitances of the photodiode 31, floating diffusion 33 and storage capacitor 36, respectively, and $C_{FD}$+$C_{CS}$ denotes the combined capacitance of the floating diffusion 33 and storage capacitor 36.

In this case, the signal φX, which is a common control signal supplied to every pixel 10, is set to a high level to maintain both the selection transistors 38 and 41 within the source follower amplifier 43 in the ON state. Before the photocharge storage is performed, the signals φT, φC and φR, which are also common control signals, are set to a high level to turn on the transfer transistor 32, storage transistor 34 and reset transistor 35 (time t0), whereby the floating diffusion 33 and storage capacitor 36 are reset (or initialized). At this point in time, the photodiode 31 is completely depleted. The potential at this point in time is shown in FIG. 12(a).

Next, φR is set to a low level to turn off the reset transistor 35, whereupon a noise signal N2, which equivalently contains a random noise generating in the floating diffusion 33 and storage capacitor 36 and a fixed pattern noise resulting from a variation in the threshold voltage of the transistor 37 in the source follower amplifier 43, is generated in the floating diffusion 33 (refer to FIG. 12(b)), and an output current corresponding to this noise signal N2 flows through the pixel output line 141. At this timing (time t1), a sampling pulse φN2 is given to the memory section 22 to turn on the sampling transistor 26d so that the noise signal N2 outputted through the pixel output line 141 is held by the capacitor 25d.

Subsequently, φC is set to the low level to turn off the storage transistor 34, whereupon the signal charges stored in the floating diffusion 33 and storage capacitor 36 at this point in time are distributed to the floating diffusion 33 and the storage capacitor 36 according to the ratio of their capacitances $C_{FD}$ and $C_{CS}$ (refer to FIG. 12(c)). In this state, a noise signal N1, which contains a random noise generated when φC was turned off and a fixed pattern noise resulting from a variation in the threshold voltage of the transistor 37 in the source follower amplifier 43, is generated in the floating diffusion 33, and an output current corresponding to this noise signal N1 flows through the pixel output line 141. At this timing (time t2), a sampling pulse φN1 is given to the memory section 22 to turn on the sampling transistor 26c so that the noise signal N1 outputted through the pixel output line 141 is held by the capacitor 25c.

Since the transfer transistor 32 is maintained in the ON state, the photocharges generated by light falling onto the photodiode 31 flow through the transfer transistor 32 (this state is shown in FIG. 6(b)) into the floating diffusion 33, and are stored in the floating diffusion 33, being superimposed on the noise signal N1 (time t3). If the floating diffusion 33 is saturated due to a large amount of photocharges produced in the photodiode 31 by an incidence of strong light, the overflowing charges are stored through the storage transistor 34 into the storage capacitor 36 (refer to FIG. 12(d)). Setting the threshold voltage of the storage transistor 34 at an appropriately low level enables those charges to be efficiently transferred from the floating diffusion 33 to the storage capacitor 36. By this method, it is possible to effectively utilize the saturated charges without discarding them even if the floating diffusion 33 has a small capacitance $C_{FD}$ and can store only a small amount of charges in the maximally saturated state. In this manner, both the charges produced before charge saturation (overflow) at the floating diffusion 33 and those produced after charge saturation (overflow) can be utilized as output signals.

After a predetermined photocharge storage time has elapsed, a sampling pulse φS1 is given to the memory section 22, with the storage transistor 34 in the OFF state, to turn on the sampling transistor 26a, whereby a signal corresponding to the charge stored in the floating diffusion 33 at that point in time (time t4) is extracted through the pixel output line 141 and held in the capacitor 25a (refer to FIG. 12(e)). The signal stored in the floating diffusion 33 at this point in time results from the superposition of a noise signal N1 and a signal S1 corresponding to the charge before an overflow. Accordingly, the signal held in the capacitor 25a equals S1+N1, which does not reflect the amount of charge stored in the storage capacitor 36.

Immediately after that, φC is set to the high level to turn on the storage transistor 34, whereupon the charge held in the floating diffusion 33 at that point in time is mixed with the charge held in the storage capacitor 36 (refer to FIG. 12(f)). In this state, a sampling pulse φS2 is given to the memory section 22 to turn on the sampling transistor 26b (time t5), whereby a signal corresponding to the charges held in the floating diffusion 33 and the storage capacitor 36, i.e. a signal resulting from the superposition of the noise signal N2 and the signal S2 corresponding to the charge after the overflow, is extracted through the pixel output line 141 and held in the capacitor 25b. Accordingly, the signal to be held in the capacitor 25b is S2+N2, which reflects the amount of charge stored in the storage capacitor 36.

By the process described to this point, the signals S1+N1, S2+N2, N1 and N2 are respectively held in the four capacitors 25a, 25b, 25c and 25d included in one memory section 22. Thus, one cycle of the image signal acquisition operation is completed. As already explained, the noise signals N1 and N2 containing the random noise and fixed pattern noise are obtained separately from the other signals containing these noise signals. Therefore, it is possible to obtain high S/N image signals free from the influence of the noise signals N1 and N2 by reading each of these signals from the capacitors 25a, 25b, 25c and 25d and then subjecting the read signals to a subtracting operation. Since the charges overflowing from the floating diffusion 33 are utilized without being discarded, even a strong incident light barely causes saturation, so that the resultant signal can reflect the light. Thus, a wide dynamic range is ensured. The possibilities of widening the dynamic range in this manner are described in detail in the Japanese Unexamined Patent Application Publication No. 2006-245522 and other documents. Therefore, no explanation will be made in this specification.

(B) Operation Mode for Relatively Long Photocharge Storage Time

Figure 13:
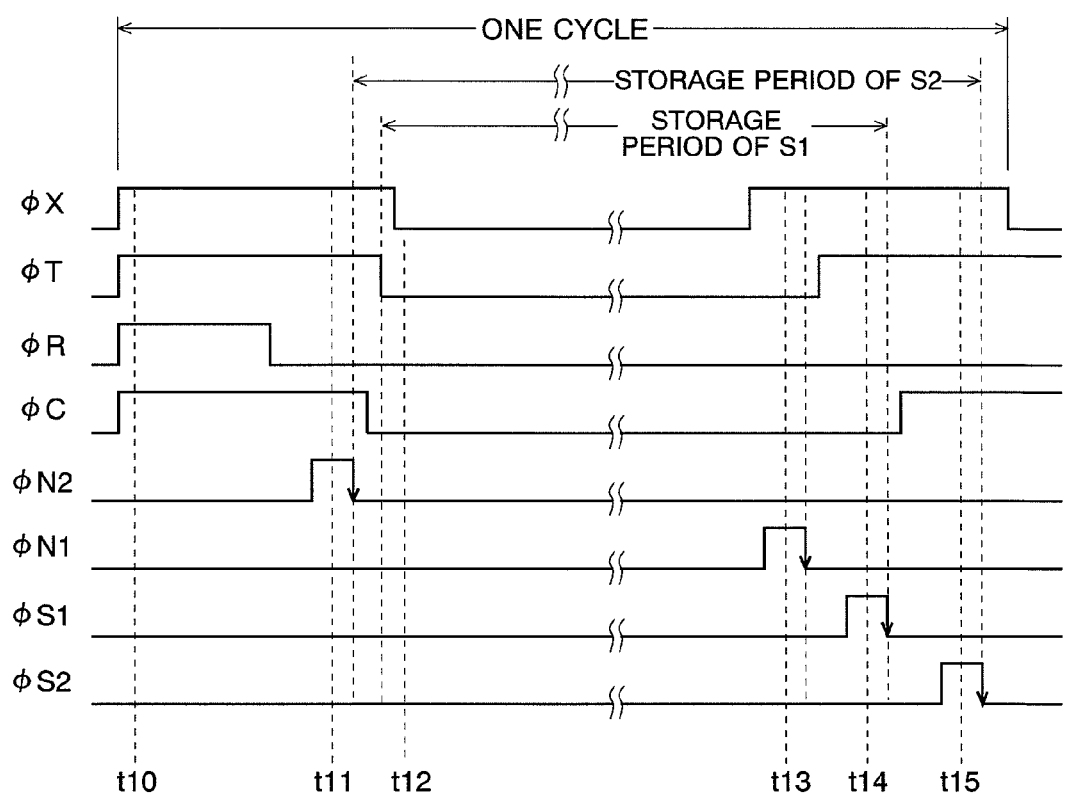
FIG. 13 is a timing chart of the solid-state image sensor of the present embodiment in the case where the photocharge storage time is relatively long.

An operation for a relatively long photocharge storage time is hereinafter described. FIG. 13 is a drive timing chart in the case where the photocharge storage time is relatively long, and FIG. 14 is a schematic potential diagram inside the pixel in this operation.

The most significant difference from the case of the short photocharge storage time exists in many points. For example, the transfer transistor 32 is turned off during the photocharge storage period so that the photocharges produced in the photodiode 31 will be stored in a depletion layer; the transfer transistor 32 is turned off during the photocharge storage period; and the sampling of the noise signal N1 is performed at the end of the photocharge storage period so that the dark charges (and photocharges) that generate in the floating diffusion 33 will not be included in the signal S1. The purpose of turning off the transfer transistor 32 is to create an accumulation state at the interface between the silicon and insulating film immediately below its gate, thus filling the silicon surface with holes to prevent intrusion of dark charges through the interface between the silicon and insulating film. Another difference is that, taking into account the long photocharge storage time, the selection transistors 38 and 41 of the source follower amplifier 43 are turned off for a predetermined period of time to reduce the power consumption.

Before the photocharge storage is performed, φT, φC and φR are set to high levels to turn on both the storage transistor 34 and reset transistor 35 (time t10), whereby the floating diffusion 33 and storage capacitor 36 are reset (or initialized). At this point in time, the photodiode 31 is completely depleted. The state of potential at this point in time is shown in FIG. 14(a).

Next, φR is set to the low level to turn off the reset transistor 35, whereupon a noise signal N2, which equivalently contains a random noise generating in the floating diffusion 33 and the storage capacitor 36 and a fixed pattern noise resulting from a variation in the threshold voltage of the transistor 37 in the source follower amplifier 43, is generated in the floating diffusion 33 (refer to FIG. 14(b)), and an output current corresponding to this noise signal N2 flows through the pixel output line 141. At this timing (time t11), a sampling pulse φN2 is given to the memory section 22 to turn on the sampling transistor 26d, whereby the noise signal N2 is extracted through the pixel output line 141 and held in the capacitor 25d. The operations to this point are identical to those of the previously described operation mode for a short photocharge storage time.

Next, φC is set to the low level to turn off the storage transistor 34, whereupon the signal charges stored in the floating diffusion 33 and storage capacitor 36 at this point in time are distributed to the floating diffusion 33 and storage capacitor 36 according to the ratio of their capacitances $C_{FD}$ and $C_{CS}$. Furthermore, φT is set to the low level to turn off the transfer transistor 32, and φX is also set to the low level to turn off the two selection transistors 38 and 41 of the source follower amplifier 43 (time t12). As a result, a potential barrier is formed between the photodiode 31 and the floating diffusion 33, creating a condition where photocharges can be stored in the photodiode 31 (refer to FIG. 14(c)).

The photocharges produced by incident light falling onto the photodiode 31 are stored in the capacitance $C_{PD}$ of the photodiode 31. When a saturation occurs in the photodiode 31, excessive charges flow through the transfer transistor 32, to be stored in the floating diffusion 33 and superimposed on the noise signal that has been distributed as described previously. If the floating diffusion 33 is saturated by stronger incident light, the charges will be stored through the storage transistor 34 into the storage capacitor 36 (refer to FIG. 14(d)).

Setting the threshold voltage of the storage transistor 34 at a level appropriately lower than that of the transfer transistor 32 enables the charges saturated in the floating diffusion 33 to be efficiently transferred from the floating diffusion 33 to the storage capacitor 36 without being returned to the photodiode 31. By this method, it is possible to effectively use the saturated charges without discarding them even if the floating diffusion 33 has a small capacitance $C_{FD}$ and can store only a small amount of charges. In this manner, both the charges produced before the overflow at the floating diffusion 33 and those produced after the overflow can be utilized as output signals.

After a predetermined photocharge storage time has elapsed, φX is set to the high level to turn on the selection transistors 38 and 41, after which a sampling pulse φN1 is given to the memory section 22 to turn on the sampling transistor 26c, whereby a noise signal N1 corresponding to the signal charge stored in the floating diffusion 33 at this point in time (time t13) is extracted through the pixel output line 14 and held in the capacitor 25c. The noise signal N1 at this point in time contains a fixed pattern noise due to a variation in the threshold voltage of the transistor 37 in the source follower amplifier 43. It should be noted that this signal contains not only the noise but also a portion of the photocharges produced by photoelectric conversion, which are also regarded as a noise in the present case.

Next, φT is set to the high level to turn on the transfer transistor 32, whereupon the photocharges stored in the photodiode 31 are completely transferred to the floating diffusion 33 (refer to FIG. 14(e)). Immediately after that (time t14), a sampling pulse φS1 is given to the memory section 22 to turn on the sampling transistor 26a, whereby a signal corresponding to the charge stored in the floating diffusion 33 is extracted through the pixel output line 14 and held in the capacitor 25a. This signal results from the superposition of the aforementioned noise signal N1 and the signal corresponding to the charge stored in the photodiode 31, i.e. the signal S1 before the overflow, and hence equals S1+N1.

Subsequently, φC is set to the high level to turn on the storage transistor 34, whereupon the charge held in the floating diffusion 33 at that point in time is mixed with the charge held in the storage capacitor 36 (refer to FIG. 14(f)). In this state, a sampling pulse φS2 is given to the memory section 22 to turn on the sampling transistor 26b (time t15), whereby a signal corresponding to the charges held in the floating diffusion 33 and storage capacitor 36 are extracted through the pixel output line 141 and held in the capacitor 25b. This signal equals S2+N2.

As a result of the processes described to this point, the signals S1+N1, S2+N2, N1 and N2 are respectively held in the four capacitors 25a, 25b, 25c and 25d included in one memory section 22. Thus, one cycle of image signal acquisition is completed. As in the case of the operation mode for the short photocharge storage time, the noise signals N1 and N2 containing the random noise and fixed pattern noise are obtained separately from the other signals containing these noise signals. Therefore, it is possible to obtain high SN image signals free from the influence of the noise signals N1 and N2 by reading each of these signals from the capacitors 25a, 25b, 25c and 25d and then subjecting the read signals to a subtracting operation. Since the charges that have overflowed from the floating diffusion 33 are not discarded but utilized, even a strong incident light barely causes saturation, so that the resultant signal can reflect the light. Thus, a wide dynamic range is ensured.

As described previously, the control signals φX, φT, φR and φC supplied to each pixel 10 are common to all the pixels. Therefore, the aforementioned operations of storing photocharges and transferring signals from each pixel 10 to the memory section 22 are simultaneously performed at all the pixels 10. That is, by one cycle of these operations, one frame of image signals are held in the 320 memory sections 22 horizontally arranged in the memory area 3a shown in FIG. 3. The operations are repeated 104 cycles to store the image signals in the memory sections 22 in all the memory section units 20. In the $105^{th}$ and subsequent cycles, the operation of writing signals in the memory sections 22 is once more initiated from the topmost memory section units 20. Thus, the signal-holding operation is cyclically carried out. This process is continued, for example, until a command signal for discontinuing the imaging is externally given. When the command signal for discontinuing the imaging is given and the imaging is thereby discontinued, the latest 104 frames of image signals are held in the memory areas 3a and 3b. By sequentially reading these signals, a series of image signals corresponding to 104 frames can be obtained.

When, as described previously, new signals are to be held in the capacitors of a memory section 22 in which some signals are already present, it is necessary to reset the capacitors in order to discard those older signals. For this purpose, though not shown in the figures, a transistor for resetting is connected to each pixel output line 141. To reset the capacitor 25 of a given memory section 22, the sampling transistor 26 of the memory section 22 is turned on and, simultaneously, the transistor for resetting connected to the corresponding pixel output line 141 is turned on, whereby the signal stored in the capacitor 25 is reset through the sampling transistor 26 and the pixel output line 141. After this resetting operation is performed, a new signal is held in the capacitor 25.

The signals held in the capacitors 25 of each memory section 22 are read by sequentially turning on the reading transistors 27 connected to the same signal output line 23. Since the four reading transistors 27a-27d of the same memory section 22 are respectively connected to the different signal output lines 23a-23d, the signals held in each of the four capacitors 25a-25d in the same memory section 22 can be simultaneously read. Using these signals, the subtracting operations of (S1+N1)−N1 and (S2+N2)−N2 can be performed by a subtraction circuit (now shown) provided inside or outside the sensor to extract each of the signals S1 and S2 free from the random noise and fixed pattern noise. Which of S1 and S2 should be used is determined with reference to an appropriate signal level (threshold value) equal to or lower than the saturation level of the signal S1; S1 is selected when the signal is equal to or higher than the reference level, and S2 when the signal is lower than the reference level. By performing this selection below the signal saturation level, it is possible to avoid the influence of saturation variation of the signal S1.

Figure 15:
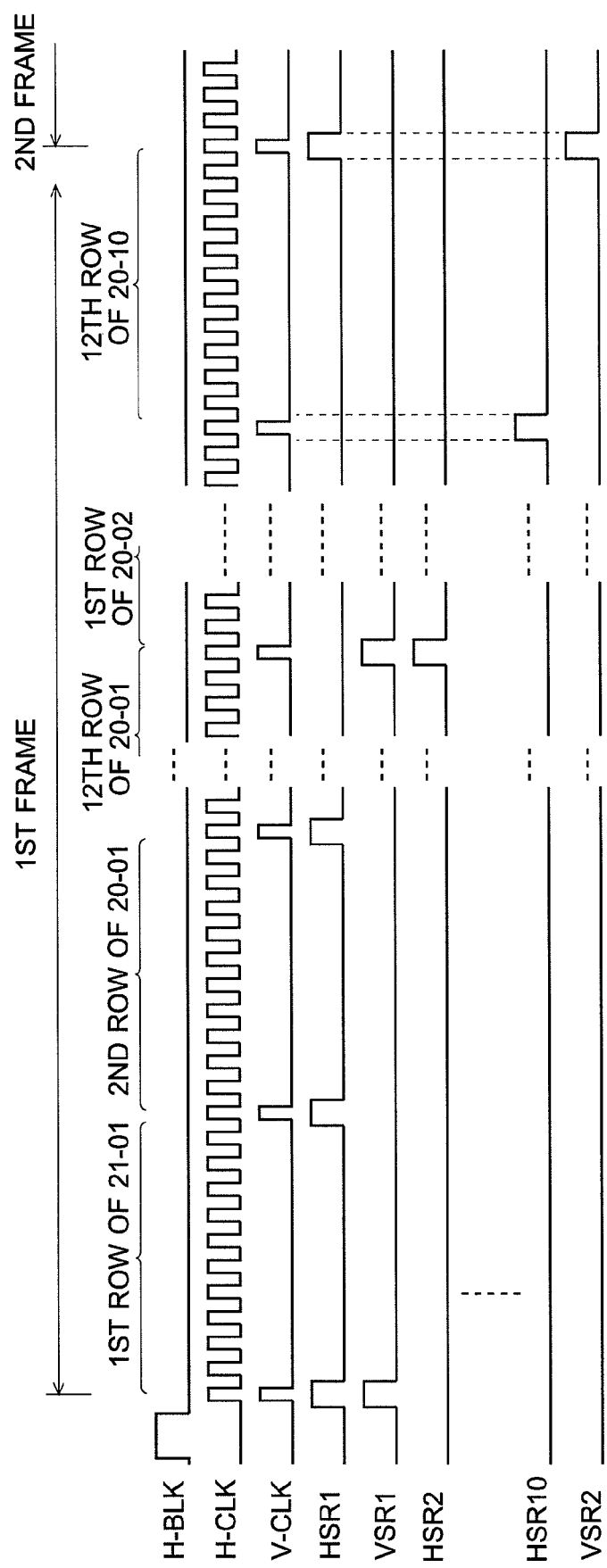
FIG. 15 is an operation timing chart of sequential reading of the pixel signals in the solid-state image sensor of the present embodiment.

Next, an operation of sequentially reading signals from the memory areas 3a and 3b is described with reference to FIGS. 15 to 17. FIG. 15 is an operation timing chart of sequential reading of the signals from the memory areas 3a and 3b, FIG. 16 is an operation timing chart of the main portion of the horizontal shift registers HSR, and FIG. 17 an operation timing chart of the main portion of the vertical shift registers VSR.

As one example, the reading order at the leftmost memory section unit block 50 in the 320 memory section units 20 corresponding to the first frame in FIG. 10 is hereinafter described. In the leftmost memory section unit 20-01, image signals of eleven pixels are sequentially read from the memory sections 22 in the left-to-right direction of the first horizontal row shown in FIG. 7. This memory section unit 20-01 is selected by activating the horizontal shift register HSR1 and vertical shift register VSH1. The horizontal reading clock H-CLK produces a moving pulse signal that turns on the reading transistors 27 of the memory sections 22, one by one, from left to right in the horizontal direction. The signals y1, y2 and y3 in FIG. 16 are one example of this pulse signal. After the reading of one row is completed, a clock V-CLK for shifting the vertical reading position is supplied, whereby the memory sections 22 in the next (second) row are selected. Then, these memory sections 22 are similarly selected, from left to right, for the reading of eleven pixels. Such a process of reading pixel signals is repeated until the end of the twelfth row. The signals v1, v2 and v3 shown in FIG. 17 are one example of the signal for activating the reading transistor 27 corresponding to each row in the vertical direction.

Figure 16:
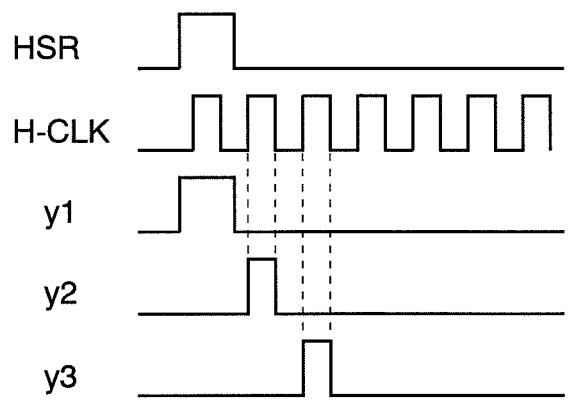
FIG. 16 is an operation timing chart of the main portion of the horizontal shift registers in the solid-state image sensor of the present embodiment.
Figure 17:
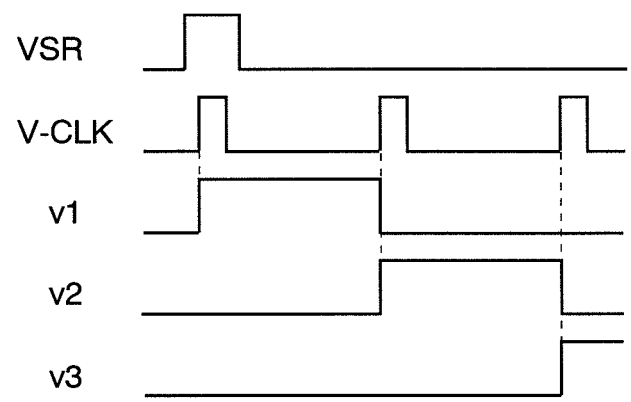
FIG. 17 an operation timing chart of the main portion of the vertical shift registers in the solid-state image sensor of the present embodiment.

Subsequently, the horizontal shift register HSR2 and vertical shift register VSR1 are activated to select the memory section unit 20-02 on the right, and this memory section unit 20-02 becomes the target of reading, as shown in FIG. 16. Then, as in the previous case, the signals are read by turning on the reading transistors 27 of each memory section 22, for one pixel after another, in the order of row→column. The sequential selection of each memory section unit 20 is continued until the memory section unit 20-10. When the reading of the memory sections 22 in the twelfth row of the memory section unit 20-10 is ended, the reading process for one frame is completed. Concurrently, in the other memory section unit blocks 50, the operation of reading signals from the memory sections of the corresponding memory section units is similarly performed.

After the pixel signals of the first frame have been entirely read in the previously described manner, the reading of pixel signals of the second frame is subsequently initiated. That is, as shown in FIG. 16, the horizontal shift register HSR1 and the vertical shift register VSR2 are activated to select the leftmost memory section unit of the second row shown in FIG. 10, and the reading operation is performed in the same order as in the case of the first frame. This process is repeated to perform the reading operation through the end of the $104^{th}$ frame. It should be noted that the reading process is not specifically limited to this one; it can be appropriately modified.

In the solid-state image sensors of the previous embodiments, the pixel output lines 14 may be arranged over the photoelectric conversion area 11. Furthermore, to increase the concentration ratio, a plurality of on-chip micro-lenses approximately shaped like a partial sphere or partial cylinder may be arranged on the pixel output lines 14 so that these lenses form images between the pixel output lines 14.

In the solid-state image sensors of the previous embodiments, the pixel area 2 (2a and 2b) and memory areas 3a and 3b are each formed as an independent area and separately located on the same surface of the semiconductor substrate 1. Alternatively, a structure with a light incidence surface on the back side may be adopted. That is, the separation of the pixel area 2 (2a and 2b) and memory areas 3a and 3b may be achieved, for example, by a structure in which the light incidence surface with a two-dimensional array of the photodiodes 31 is provided on the side opposite from the pattern surface on which the transistors and other elements are formed.

The pixel area 2 (2a and 2b) and memory areas 3a and 3b may be individually formed on separate semiconductor chips, rather than on the same semiconductor chip, and connected together by a generally known method. Specifically, it is possible to mount different semiconductor chips on separate substrates and connect them by wire-bonding for their signal exchange. Alternatively, a plurality of semiconductor chips may be vertically stacked, rather than horizontally arranged, and connected by flip-chip mounting or other techniques so that they can exchange signals.

Instead of providing the pixel area 2 (2a and 2b) and memory areas 3a and 3b on separate semiconductor chips, it is possible to form the two-dimensional array of photodiodes 31 on one semiconductor chip and the pixel area 2 (2a and 2b) and memory areas 3a and 3b exclusive of the photodiodes 31 on another semiconductor chip, and connect them by wire-bonding or flip-chip mounting.

It should be noted that the foregoing embodiments are mere examples of the solid-state image sensor according to the present invention; any change, modification or addition that is appropriately made within the spirit of the present invention naturally falls within the scope of the claims of the present patent application.

The invention claimed is:

1. A solid-state image sensor comprising:
   a) a pixel area in which a plurality of pixels are arranged in a two-dimensional array, each pixel including a photoelectric conversion element for receiving light and producing photocharges; and
   b) a memory area provided separately from the pixel area and having a plurality of memory sections for holding output signals corresponding to each of the plurality of pixels within the pixel area;
   wherein one respective pixel output line independently extends from each pixel within the pixel area, each of the plurality of pixels is connected to multiple memory sections of the plurality of memory sections in parallel through the pixel output line.

2. The solid-state image sensor according to claim 1, which is characterized in that the plurality of memory sections each include at least one memory element and has a gate unit provided between each memory element and the pixel output line.

3. The solid-state image sensor according to claim 1, which is characterized in that each pixel within the pixel area includes: a transfer element for transferring the photocharges produced by the photoelectric conversion element to a detection node for converting electric charge signals to voltage signals; a buffer element, provided between the detection node and the pixel output line of each pixel, for sending signals from the detection node to the pixel output line; and a reset element for resetting at least the photoelectric conversion element and the detection node.

4. The solid-state image sensor according to claim 3, which is characterized in that each pixel within the pixel area includes at least one charge storage element for storing photocharges overflowing from the photoelectric conversion element via the transfer element or from the detection node during an operation of storing photocharges.

5. The solid-state image sensor according to claim 3, which is characterized in that each of the plurality of memory sections corresponding to one pixel has a plurality of memory elements capable of independently holding an output signal from the pixel, and a control signal is supplied to each pixel and each memory section so that a noise component remaining when the photoelectric conversion element and the detection node are reset in each pixel, and a signal corresponding to the charge resulting from the storage of the photocharges, are held by different memory elements in the same memory section within one cycle of the photocharge storage operation.

6. The solid-state image sensor according to claim 3, which is characterized in that the pixel area has a rectangular planar shape, and the memory area is arranged on an outside of one or more of four sides of the pixel area.

7. The solid-state image sensor according to claim 6, which is characterized in that the memory area is divided into sections corresponding to the pixel-area sections and each of the memory-area sections is arranged on an outside of a different side of four sides of the pixel area.

8. The solid-state image sensor according to claim 3, which is characterized in that the plurality of pixel output lines are arranged on the photoelectric conversion element, and a plurality of on-chip micro-lenses approximately shaped like a partial sphere or partial cylinder are arranged over the plurality of pixel output lines so that these lenses form images between the plurality of pixel output lines.

9. The solid-state image sensor according to claim 3, which is characterized in that the memory section includes a capacitor and a switch element for receiving an output signal received from each pixel through the pixel output line and sending the output signal into the capacitor.

10. The solid-state image sensor according to claim 3, which is characterized in that at least the photoelectric conversion elements of the pixels are provided on a back side of a semiconductor substrate opposite from an element formation surface on which the memory area is formed, and the back side is used as a light-incidence surface.

11. The solid-state image sensor according to claim 3, which is characterized in that the solid-state image sensor is constructed as a three-dimensional integrated circuit with a plurality of semiconductor layers separated by an insulating layer, and the pixel area and the memory area are formed on different semiconductor layers.

12. The solid-state image sensor according to claim 3, which is characterized in that the solid-state image sensor is composed of a plurality of semiconductor integrated circuit elements, and the pixel area and the memory area are formed on different semiconductor integrated circuit elements.

13. A solid-state image sensor, comprising:
   a) a photoelectric conversion element for receiving light and producing photocharges;
   b) a transfer element for transferring the photocharges produced by the photoelectric conversion element to a detection node for converting electric charge signals to voltage signals;
   c) a buffer element for sending an output signal from the detection node to a pixel output line;
   d) a reset element for resetting at least the photoelectric conversion element and the detection node; and
   e) a plurality of memory sections for holding the output signals sent from the same buffer element through the pixel output line,
   wherein the photoelectric conversion element, the transfer element, the buffer element and the reset element form one pixel, a plurality of the pixels are arranged in a two-dimensional array within a pixel area, the plurality of memory sections are integrated for each pixel and placed within a memory area provided separately from the pixel area, and each of a plurality of output lines independently extends from each pixel,
   each of the plurality of pixels is connected to multiple memory sections of the plurality of memory sections in parallel through the pixel output line.

14. The solid-state image sensor according to claim 13, which is characterized in that each pixel within the pixel area includes at least one charge storage element for storing photocharges overflowing from the photoelectric conversion element via the transfer element or from the detection node during an operation of storing photocharges.

15. The solid-state image sensor according to claim 13, which is characterized in that a common control signal is supplied to all the pixels so that an operation of storing photocharges in each pixel and an operation of reading signals from each pixel through the pixel output line are simultaneously performed at all the pixels.

16. The solid-state image sensor according to claim 13, which is characterized in that a control signal is supplied to each pixel and each memory section so that an operation of storing photocharges in each pixel and an operation of reading signals from each pixel through the pixel output line are simultaneously repeated at all the pixels, and the signal transferred through each pixel output signal for every signal-reading operation is sequentially held by the plurality of memory sections.

17. The solid-state image sensor according to claim 13, which is characterized in that each of the plurality of memory sections corresponding to one pixel has a plurality of memory elements capable of independently holding an output signal from the pixel, and a control signal is supplied to each pixel and each memory section so that a noise component remaining when the photoelectric conversion element and the detection node are reset in each pixel, and a signal corresponding to the charge resulting from the storage of the photocharges, are held by different memory elements in the same memory section within one cycle of the photocharge storage operation.

18. The solid-state image sensor according to claim 13, which is characterized in that each of the plurality of memory sections corresponding to one pixel has a plurality of memory elements capable of independently holding an output signal from the pixel, and a control signal is supplied to each pixel and each memory section so that a noise component remaining when the photoelectric conversion element and the detection node are reset in each pixel, a signal corresponding to the charges before an overflow into the charge storage element occurs during a process of storing photocharges, and a signal corresponding to the charges after an overflow into the charge storage element occurs during the process of storing photocharges, are held by different memory elements in the same memory section within one cycle of the photocharge storage operation.

19. The solid-state image sensor according to claim 13, which is characterized in that the pixel output lines extending from a plurality of pixels belonging to a same column or row are integrated together for each column or row and arranged in a vertical direction or horizontal direction.

20. The solid-state image sensor according to claim 13, which is characterized in that the pixel area is divided into plural sections in the vertical direction and/or horizontal direction, the pixel output lines extending from a plurality of pixels belonging to a same column or row within each of the pixel-area sections are integrated together for each column or row and arranged in a vertical direction or horizontal direction.

21. The solid-state image sensor according to claim 13, which is characterized in that the pixel area has a rectangular planar shape, and the memory area is arranged on an outside of one or more of four sides of the pixel area.

22. The solid-state image sensor according to claim 21, which is characterized in that the memory area is divided into sections corresponding to the pixel-area sections and each of the memory-area sections is arranged on an outside of a different side of four sides of the pixel area.

23. The solid-state image sensor according to claim 13, which is characterized in that the plurality of pixel output lines are arranged on the photoelectric conversion element, and a plurality of on-chip micro-lenses approximately shaped like a partial sphere or partial cylinder are arranged over the plurality of pixel output lines so that these lenses form images between the plurality of pixel output lines.

24. The solid-state image sensor according to claim 13, which is characterized in that the memory section includes a capacitor and a switch element for receiving an output signal received from each pixel through the pixel output line and sending the output signal into the capacitor.

25. The solid-state image sensor according to claim 13, which is characterized in that at least the photoelectric conversion elements of the pixels are provided on a back side of a semiconductor substrate opposite from an element formation surface on which the memory area is formed, and the back side is used as a light-incidence surface.

26. The solid-state image sensor according to claim 13, which is characterized in that the solid-state image sensor is constructed as a three-dimensional integrated circuit with a plurality of semiconductor layers separated by an insulating layer, and the pixel area and the memory area are formed on different semiconductor layers.

27. The solid-state image sensor according to claim 13, which is characterized in that the solid-state image sensor is composed of a plurality of semiconductor integrated circuit elements, and the pixel area and the memory area are formed on different semiconductor integrated circuit elements.

* * * * *